United States Patent [19]

Kindig

[11] Patent Number: 5,277,368
[45] Date of Patent: Jan. 11, 1994

[54] COAL CLEANING PROCESS

[75] Inventor: James K. Kindig, Boulder, Colo.

[73] Assignee: Genesis Research Corporation, Carefree, Ariz.

[21] Appl. No.: 987,598

[22] Filed: Dec. 9, 1992

Related U.S. Application Data

[60] Division of Ser. No. 775,860, Oct. 15, 1991, which is a continuation-in-part of Ser. No. 492,312, Mar. 6, 1990, Pat. No. 5,096,066, which is a continuation of Ser. No. 126,419, Nov. 30, 1987, abandoned.

[51] Int. Cl.$^5$ .............. B03B 5/32; B03B 5/30; B03B 7/00; B04C 9/00
[52] U.S. Cl. .................... 241/20; 241/24; 209/12; 209/17; 209/3; 209/39; 209/172.5; 209/211; 423/632; 423/633; 423/634; 44/621; 44/622; 44/627
[58] Field of Search ............ 209/12, 17, 39, 172.5, 209/211, 3, 10; 241/20, 21, 24; 44/621, 622, 627; 423/632, 633, 634

[56] References Cited

U.S. PATENT DOCUMENTS

| | | | |
|---|---|---|---|
| 2,075,542 | 3/1937 | Pruyn | 210/203 |
| 2,696,299 | 12/1954 | Van Os | 209/172.5 |
| 2,701,641 | 2/1955 | Krijgsman | 209/172.5 |
| 2,819,795 | 1/1958 | Fontein et al. | 209/211 |
| 2,870,003 | 1/1959 | Cavanagh | 75/34 |
| 2,932,395 | 4/1960 | Marot | 209/172.5 |
| 2,950,955 | 8/1960 | Wagner | 23/200 |
| 3,034,884 | 5/1962 | Meyer et al. | 75/1 |
| 3,378,335 | 4/1968 | Ellis et al. | 23/51 |
| 3,794,162 | 2/1974 | Miller et al. | 209/172.5 |
| 3,908,912 | 9/1975 | Irons et al. | 241/20 |
| 4,010,239 | 3/1977 | Dor | 423/244 |
| 4,028,228 | 6/1977 | Ferris et al. | 209/39 |
| 4,133,747 | 1/1979 | Visman | 209/10 |
| 4,140,628 | 2/1979 | Horsfall | 209/39 |
| 4,169,786 | 10/1979 | Horsfall | 209/12 |
| 4,175,035 | 11/1979 | Moyer | 209/10 |
| 4,219,409 | 8/1980 | Liller | 209/13 |
| 4,244,530 | 1/1981 | Halvorsen | 241/24 |
| 4,282,088 | 8/1981 | Ennis | 209/17 |
| 4,283,232 | 8/1981 | Best | 127/71 |
| 4,341,352 | 7/1982 | Liller | 241/21 |
| 4,364,822 | 12/1982 | Rich | 209/3 |
| 4,406,781 | 9/1983 | Nightingale | 209/211 |
| 4,436,681 | 3/1984 | Barczak et al. | 264/67 |
| 4,478,601 | 10/1984 | Stephens | 44/14 |
| 4,737,271 | 4/1988 | Childs | 209/144 |
| 4,777,031 | 10/1988 | Senecal | 423/632 |
| 4,802,976 | 2/1989 | Miller | 209/12 |
| 4,865,740 | 9/1989 | Callut | 210/512.2 |
| 5,022,892 | 6/1992 | Klima et al. | 44/621 |
| 5,096,066 | 3/1992 | Kindig | 209/172.5 |
| 5,108,626 | 4/1992 | Lees | 210/512.1 |
| 5,153,838 | 10/1992 | Kindig | 364/468 |

OTHER PUBLICATIONS

Deurbrouck, "Washing Fire Sized Coal in a Dense Media Cyclone" Bureau of Mines Report #7982 (1974).

(List continued on next page.)

*Primary Examiner*—Thomas M. Lithgow
*Attorney, Agent, or Firm*—Sheridan, Ross & McIntosh

[57] ABSTRACT

Fine particle coal is beneficiated in specially designed dense medium cyclones to improve particle acceleration and enhance separation efficiency. Raw coal feed is first sized to remove fine coal particles. The coarse fraction is then separated into clean coal, middlings, and refuse. Middlings are comminuted for beneficiation with the fine fraction. The fine fraction is deslimed in a countercurrent cyclone circuit and then separated as multiple fractions of different size specifications in dense medium cyclones. The dense medium contains ultra-fine magnetite particles of a narrow size distribution which aid separation and improves magnetite recovery. Magnetite is recovered from each separated fraction independently, with non-magnetic effluent water from one fraction diluting feed to a smaller-size fraction, and improving both overall coal and magnetite recovery. Magnetite recovery is in specially designed recovery units, based on particle size, with final separation in a rougher-cleaner-scavenger circuit of magnetic drum separators incorporating a high strength rare earth magnet.

53 Claims, 9 Drawing Sheets

OTHER PUBLICATIONS

Deurbrouck, "Performance Characteristics of Coal Washing Equipment Dense Media Cyclones" Bureau of Mines Report #7673 (1972).

Sokaski, "Cleaning Unsized Fine Coal In a Dense-Medium Cyclone Pilot Plant," Bureau of Mines Report #6274 (1963).

Arterburn, *The Sizing of Hydrocyclones*, Krebs Engineering (Oct. 1976).

Fourie, et al., *The Beneficiation of Fine Coal by Dense-Medium Cyclone*, Journal of South African Institute of Mining and Metallurgy, pp. 357–361 (Oct. 1980).

Gochin, et al., *Dense Medium Separation*, Mining Magazine, pp. 453–467 (Dec. 1983).

Menglers, et al., *HM Cyclones, If Run on Brine Medium, Offer Sharper Separation of Coal Fines*, Coal Mining and Processing, pp. 78–80 (Sep. 1982).

Geer, et al., *Preliminary American Tests of a Cyclone Coal Washer Developed in the Netherlands*, Transactions of the American Institute of Mining and Metallurgical Engineers, Coal Division, vol. 177, pp. 220–239 (1948).

Lotzien, et al., *Cleaning of Ultra-Fines in Heavy Liquid Cyclones*, Aufbereitungs-Technik, vol. 28, No. 10, pp. 563–570 (W. Germany, Oct. 1987).

Chakravarti, et al., *A Study of the Operation of a 6 in. Diameter Cyclone Washer*, Journal of the Institute of Fuel, pp. 612–622 (Great Britain, Nov. 1957).

Stoessner, et al., *Optimization of Dense Medium Cyclone Performance for Low Gravity, Fine Coal Cleaning* (1986).

Bradley, *The Hydrocyclone*, Pergamon Press Ltd., pp. 19–40, 48–62 and 107–133 (1965).

Durham, et al., *Power Plant Fly Ash Magnetite Performs Well in Coal Cleaning*, Power Engineering, pp. 52–55 (Apr. 1986).

Nielson, et al., *Ultrafine Metal Oxides by Decomposition of Salts in a Flame*, Symposium on Ultrafine Particles, 1961, Indianapolis, pp. 181–195 (Wiley, New York 1963).

Ruthner, et al., *Spray-Roasted Iron Oxide for the Production of Ferrites*, Ferrites: Proceedings of the International Conference, Jul. 1970, Japan, pp. 75–78.

LIBERATION

MAGNETITE RECOVERY CIRCUIT FOR 1/2 mm x 150 MESH

ROUGHER-CLEANER-SCAVENGER MAGNETIC SEPARATOR CIRCUIT FOR SEPARATING MAGNETITE FROM FINE COAL

Separation Gravity: 1.49
Probable Error: 0.032

COAL CLEANING PROCESS

This is a divisional of application Ser. No. 07/775,860, filed Oct. 15, 1991, which is a continuation-in-part of application Ser. No. 07/492,312 filed Mar. 6, 1990, now U.S. Pat. No. 5,096,066 issued Mar. 17, 1992, which is a continuation of application Ser. No. 07/126,419 filed Nov. 30, 1987, now abandoned.

FIELD OF THE INVENTION

The present invention is directed generally to the field of coal cleaning processes, and in particular, is directed to removal of refuse, such as sulfur-containing minerals, from fine coal particles.

BACKGROUND OF THE INVENTION

Coal is a widely used, but limited, fuel for generating electricity in the United States and around the world. However when burned, coal can emit significant amounts of pollutants which create environmental problems. Environmental concern is exemplified by the Clean Air Act Amendments of 1990 creating new emissions limitations for coal of 2.5 pounds of sulfur dioxide per million BTU effective in 1995 and 1.2 pounds of sulfur dioxide per million BTU effective in the year 2000.

A utility that burns high sulfur coal currently has the option of switching to a low sulfur coal or scrubbing flue gases to remove sulfur dioxide. Scrubbing sulfur dioxide requires significant capital investment and is operationally expensive. For many utilities, switching to low sulfur coal would be very expensive due to transportation costs for delivering coal from a distant source and capital costs associated with plant modification to accommodate coals with different combustion characteristics. Substantial deposits of high sulfur coal currently fuel many electrical power generation plants. A need exists to improve the cleaning of sulfur from such coals prior to combustion so that they may be efficiently used without producing excessive pollutants.

Beneficiation of coal refers to the removal of non-coal material from raw coal to produce a relatively clean coal product. Raw coal is composed of high purity coal material and non-coal material. Non-coal material in coal, commonly referred to as ash, normally includes pyrite, clays, and other aluminosilicate materials. The presence of large amounts of these ash materials can create problems during combustion, such as slagging and fouling. Sulfur is present in raw coal in two forms, organic sulfur and inorganic sulfur. Organic sulfur is chemically bound as part of the coal matrix. Inorganic sulfur is all sulfur not chemically bound in the coal matrix. Pyrite sulfur is the predominate form of inorganic sulfur. Sulfate sulfur is another form of inorganic sulfur associated with ash forming materials. Physical beneficiation effectively removes only inorganic sulfur. Processes for beneficiating coal are varied, but commonly utilize dense medium separation, jigs, or froth flotation to separate clean coal from non-coal material. Because of its versatility, high efficiency and ease of operation, dense medium separation is perhaps the preferred separation technique.

In dense medium separation, raw coal is introduced into a medium having a specific gravity intermediate between that of coal and non-coal material. The dense medium may be a homogeneous liquid, but is more often composed of water and magnetic particles, such as ferromagnetic particles. Magnetite is a commonly used magnetic particle. Separation can be carried out in a dense media bath or tank, or in a cyclone. When a cyclone is used, coal is generally removed as the overflow product while refuse becomes the underflow product. After separation of coal and refuse, it is advantageous to recover the magnetic particles from the coal and from the refuse for reuse.

Raw coal feed, typically known as run-of-mine coal, is a mixture of three components, namely organic material, rock and pyrite. In raw coal, some particles are liberated, meaning that they constitute relatively pure components. Other particles are locked, meaning that these particles contain two or more of the three components locked together. Such locked particles are referred to as middlings.

Each of the raw coal components has a characteristic specific gravity. To illustrate, organic material has a specific gravity of about 1.25, rock has a specific gravity of about 2.85 and pyrite has a specific gravity of about 5.0. A raw coal feed contains particles with many specific gravities as a result of the differing specific gravities of the three separate components and the combination of components which are locked together.

While dense medium beneficiation has been effective for large size coal feed particles, those greater than approximately 0.5 mm in size, it has typically not been used for smaller-size coal particles. In this regard, the separation efficiency for small particle coal feeds has not been satisfactory. As a result, small coal particles are often discarded.

One way to improve the separation of coal from non-coal material is to crush or otherwise comminute the raw feed to liberate high purity coal and non-coal material in the middlings. Generally, as the average size of the particles in the raw coal feed becomes smaller, more coal and non-coal material are liberated and the percentage of particles constituting middling decreases, potentially allowing the recovery of more coal product. Crushing or grinding a coal feed to liberate coal locked with non-coal material in middlings has not been practical because there was no process for treating fines which efficiently separates coal from non-coal material. Middlings material, therefore, either reports to the clean coal, which introduces pyrite and other unwanted minerals into the fuel, or reports to the refuse resulting in an undesirable loss of coal. Comminution of an entire coal feed is, however, costly and not commercially practical. The expense of comminution is significant and it would be desirable to minimize the costs.

As indicated above, in order to recover coal from middlings to produce a high purity coal product, it is necessary to comminute the middlings and then to separate the coal from refuse. If middlings are not processed for further coal recovery, a substantial quantity of useable coal in the middlings will be discarded along with non-coal material. Accordingly, to maximize recovery of a clean coal product, it is essential to develop beneficiation processes designed to handle small particle raw coal feed.

U.S. Pat. No. 4,364,822, by Rich, issued Dec. 21, 1982, describes a coal cleaning process involving two-stage cyclone separation that produces three products, clean coal, refuse, and middlings. Middlings are then crushed and recycled through the cyclones with the raw coal feed. Rich, however, specifically teaches away from a dense medium process using magnetic particles based on problems with the recovery of magnetic particles.

U.S. Pat. No. 3,908,912 by Irons, issued Sep. 30, 1975, describes a process whereby refuse is initially separated out at high density, followed by a lower density separation to yield clean coal and middlings. Middlings are then crushed for further cleaning. However, in Irons small size coal is not removed from the coal feed prior to the initial high density separation which results in additional refuse in the clean coal product. Moreover, Irons discloses that cyclone separations of small coal fines are inefficient in that particles are frequently misplaced. As such, Irons teaches the use of secondary cyclones followed by flotation to eliminate refuse in the coal.

Many attempts have been made to clean fine particle coal, with varying results. In dense medium cycloning, separation efficiency drops as coal feed particles become smaller. In particular, considerable difficulty is encountered in cleaning a coal feed made up of particles less than about 0.5 mm in size. Also, recovery of the magnetic particles from the dense medium after beneficiation becomes more difficult as coal feed particles become smaller.

Accordingly, there is a need for an effective and efficient means for beneficiating coal feed particles less than about 0.5 mm in size where the separation efficiency is sufficient such that the coal product meets desired specifications. The separation efficiency of a coal cleaning process is frequently illustrated through probability curves known as partition curves. These curves describe the probability that a given particle in the feed will report to the clean coal rather than refuse. The measure of the slope of the vertical portion of a partition curve is the separation's probable error, or Ep. The more vertical the center portion of the partition curve, the more efficient the separation and the smaller the probable error.

In order to avoid the difficulties associated with cleaning small size particles, many methods for processing fine coal particles discard particles below a threshold size prior to beneficiation, typically referred to as desliming. Desliming has traditionally been based on limitations of the beneficiation process. For example, U.S. Pat. No. 3,794,162 by Miller et al., issued Feb. 26, 1974, discloses a heavy medium beneficiating process for particles down to 150 mesh (0.105 mm). Particles smaller than 150 mesh are screened-out prior to beneficiation by dense medium cyclone. U.S. Pat. No. 4,282,088 by Ennis, issued Aug. 4, 1981, discloses a process where particles smaller than 0.1 mm are separated out in a cyclone classifier and discarded prior to beneficiation by dense medium cyclone. When all particles below 0.1 mm or 0.105 mm in size are discarded, pure coal is also discarded both as small coal particles and as coal locked in small middling particles.

The ability to deslime by screening or sieving is limited by available screen and sieve construction. Screening or sieving large quantities of material below a size of about 150 mesh is not practical. Classifying cyclones, which separate particles based on different particle settling velocities, have been used to classify coal feeds, but have not been effective for making a size classification of coal feed at 0.015 mm. Rejecting only the smallest coal particles in raw coal feed, on the order of 0.015 mm and smaller, presents a major problem. Particles smaller than this size are predominantly refuse material which should be discarded.

One parameter in cyclone design which has received relatively little attention is the size of the inlet orifice through which feed enters the cyclone. Arterburn, in a paper entitled, "The Sizing of Hydrocyclones" (Krebbs Engineers 1976), notes that feed orifices usually have an area between 6 percent and 8 percent of the area of the cyclone feed chamber. The modification of inlet diameters has not been identified as a factor to improve a classifying cyclone separation capability.

Multiple classifying cyclones arranged in a countercurrent flow circuit have been used for size classification of starch. U.S. Pat. No. 4,282,232 by Best, issued Aug. 11, 1981, describes a countercurrent cyclone circuit designed primarily to wash starch. As far as the inventor knows, a countercurrent arrangement of classifying cyclones is not practiced in the coal cleaning industry and has not been used to separate particles of the magnitude of 0.015 mm and smaller.

Attempts have been made in the coal industry to eliminate the need for desliming by improving the beneficiation process. For example, U.S. Pat. No. 4,802,976, by Miller, issued Feb. 7, 1989, discloses a process in which froth flotation is used to recover coal particles smaller than 28 mesh (0.595 mm) downstream of a dense media cyclone. But this process is not appropriate for all coals. A raw coal feed often contains oxidized coals which do not float. Also, pyrite tends to float, along with clean coal, thereby contaminating the clean coal product. Devising a process to treat all types of fine particle coal and to effectively remove pyrite from the smallest size fractions, has been problematic.

Cyclones for use in connection with dense medium beneficiation have varying size parameters and can be subject to varying operating conditions. In general, cyclones do not operate as effectively when used to beneficiate small size particles. A problem with the use of cyclones for the beneficiation of small coal particles is the need to assure that the particles correctly report to either the underflow as refuse or overflow as coal. Small particles often become misplaced, thereby decreasing the separation efficiency of the cyclone.

One cyclone parameter is the area of the inlet orifice through which raw coal feed enters the cyclone. U.S. Pat. No. 2,819,795 by Fontein, issued Jan. 14, 1958, discloses a cyclone design where the area of the inlet is calculated to equal between 0.1 and 0.4 times the area available for overflow. Fontein also specifies a cyclone diameter between two and three times the diameter of the overflow. Fontein does not discuss the inlet diameter as related to the cyclone diameter or particle velocity. U.S. Pat. No. 4,341,382 by Liller, issued Jul. 27, 1982, discloses a design for an eighteen inch diameter cyclone where the inlet tube diameter is calculated to equal between 0.25 and 0.35 times the cyclone diameter.

Fourie et al., "The Beneficiation of Fine Coal by Dense-Medium Cyclones", *Journal of South African Institute of Mining and Metallurgy*, pp. 357–361 (October 1980), discloses the use of magnetite particles in beneficiating minus 0.5 mm coal by dense medium cycloning where at least 50 percent of the magnetite is finer than 10 microns (0.010 mm). Finer size magnetite is, however, more difficult and costly to recover from clean coal and refuse. Fourie discloses the recovery of magnetite in a rougher-cleaner-scavenger arrangement of wet drum magnetic separators and reported serious problems with magnetite loss. There is a need for a process which employs magnetite small enough to separate fine size coal and refuse effectively, but allows for sufficient recovery of magnetite after beneficiation.

Magnetite used in Fourie was prepared by milling magnetite ore. But milling ore to ultra-fine sizes is very expensive, and milling gives little control over particle size distribution. Magnetite for use in dense media separation can also be produced by chemical reduction of hematite. U.S. Pat. No. 4,436,681 by Barczak, issued Mar. 13, 1984, discloses a process Whereby hematite prepared by spray roasting of iron chloride is reduced to magnetite. However, Barczak does not discuss magnetite particle size or recognize problems encountered during magnetite recovery following dense medium separation.

U.S. Pat. No. 4,777,031 by Senecal, issued Oct. 11, 1988, discloses a process whereby magnetite is produced by pyrohydrolysis of iron chloride at temperatures between 1000° C. and 1600° C. However, Senecal is directed to producing magnetite particles between 0.02 and 0.2 microns (0.00002 mm to 0.0002 mm) in size that are well suited for binder systems such as those used in magnetic recording media. Senecal's process results in magnetite particles too small to be used effectively in dense medium separation of coal due to problems with recovering such small particles following dense medium separation.

Magnetite used in dense medium separation has traditionally been recovered for reuse by first draining the medium from the separated product over screens and then rinsing the product over screens to remove the remaining magnetite. Magnetite is then separated from the rinse water, dilute medium, by magnetic separation. However, when cleaning fine size coal particles, screens are not effective to keep coal and refuse particles from passing through with the medium and rinse water. These fine particles of coal and non-coal material contaminate the dense medium and are difficult to separate from the magnetite in conventional magnetic drum separators.

Another problem with the recovery of small magnetite particles is that it is difficult to separate the magnetite from rinse water by magnetic separation. U.S. Pat. No. 4,802,976 by Miller, issued Feb. 7, 1989, proposes recovering magnetite as the sink from froth flotation cells, thereby avoiding the problem of fine coal and non-coal particles entrained with magnetite during magnetic separation. Froth flotation systems are, however, complex and difficult to operate. The use of a magnetic separator incorporating a high density gradient magnet in a matrix design could be employed. However, high density gradient magnets are expensive and matrix separators complicate operation compared to traditional magnetic drum separators. There is a need for an effective separation process using easier to operate magnetic separators and more economical designs for magnetic separation.

In order to satisfy utility combustion requirements, the clean coal product from beneficiation must be dewatered to reduce its moisture content. Fine particle coal is more difficult to dewater than larger-size coal because of its greater surface area.

In light of the foregoing, what is needed is an improved process for beneficiating fine particulate coal such that desired specifications, such as sulfur content, can be met. Many of the problems impeding development of such a process have been described, and they are formidable. A need exists for a process that maximizes the recovery of coal without the expense of comminuting the entire coal feed. Also, methods of classifying coal particles based on size must be improved, particularly methods using classifying cyclones. Improved separation efficiency of fine particle coal in high throughput dense medium cyclones is desired. Methods to effectively recover ultra-fine size magnetic particles for reuse following dense medium separation are needed to improve the viability of dense medium separation of fine particle coal. Improved methods are also needed for producing magnetic particles of optimum size to effect good dense medium separation while maximizing magnetic particle recovery.

SUMMARY OF THE INVENTION

In accordance with one embodiment of the present invention, a process for beneficiating fine particle coal in specially designed dense medium cyclones to improve particle acceleration and to enhance separation efficiency is provided. Raw coal feed is first sized to isolate the coarse and fine coal fractions. The coarse fraction is then separated into clean coal, middlings, and refuse. Middlings are comminuted for beneficiation with the fine fraction. The fine fraction is deslimed in a countercurrent classifying cyclone circuit and then separated into multiple fractions according to size prior to dense medium cycloning.

The dense medium contains ultra-fine magnetic particles of a narrow size distribution that aids separation and improves subsequent recovery of the magnetic particles. Magnetic particles are recovered from the clean coal and refuse fractions independently. Magnetic particle recovery is in specially designed recovery units, based on particle size, with the more conventional drain-and-rinse approach applied to coarser fractions, but with final separation in a rougher-cleaner-scavenger circuit of wet drum magnetic separators incorporating a high strength rare earth magnet. The overall coal processing circuit can be arranged so that the non-magnetic effluents from the magnetite recovery systems of coarser coal fractions, which may contain some unrecovered fine magnetite, ultimately flow to the rougher-cleaner-scavenger circuit which recovers virtually all fine magnetite.

One advantage of the present invention is that it constitutes an effective process for beneficiating coal particles smaller then 0.5 mm. An advantage of one embodiment of the invention is that it provides a process for desliming of raw feed coal prior to beneficiation which minimizes the amount of coal discarded as slimes and aids in subsequent magnetic particle recovery and dewatering of the coal product.

In accordance with an embodiment of the present invention, a process is provided for classifying ultra-fine particles employing a classifying cyclone having an inlet area within a specified range. In another embodiment of the invention, a process is provided for classifying small particles by size using multiple classifying cyclones. While reference to the partitioning of particles by classification cyclones to overflow and underflow is described as being by size, it is recognized that classification is by settling velocity which is influenced not only by size but also by other particle parameters including particle specific gravity and shape. Another embodiment provides a process for recovering magnetic particles used in dense medium cycloning involving sizing and classifying the coal feed into narrow size fractions for processing.

In accordance with one embodiment of the invention, a process for beneficiating extremely fine coal by dense medium separation using magnetic particles of a particular particle size and size distribution is provided. In accordance with another embodiment, magnetite is produced by reduction of hematite, which magnetite exhibits properties desirable for dense medium separation and for which recovery is improved following separation. In accordance with another embodiment, a process of dense medium separation of extremely fine particle coal in a cyclone with inlet area sized within a specific range is provided.

In accordance with another embodiment of the present invention, a process for recovering magnetic particles following dense medium separation is provided whereby the non-magnetic effluent from the magnetite recovery unit of a larger-particle-size coal fraction containing both unrecovered clean coal and magnetite is sent to circuits treating smaller-size coal fractions, which circuits employ a rougher-cleaner-scavenger magnetite recovery circuit which captures virtually all the magnetite while also recovering the coal. In accordance with another embodiment of the present invention, a process of wet drum magnetic separation using a rare earth magnet is provided. In accordance with another embodiment, a process for dewatering and agglomerating extremely fine coal involving the addition of paper fibers to the coal is provided.

DETAILED DESCRIPTION OF THE PREFERRED EMBODIMENT

Figure 1A:
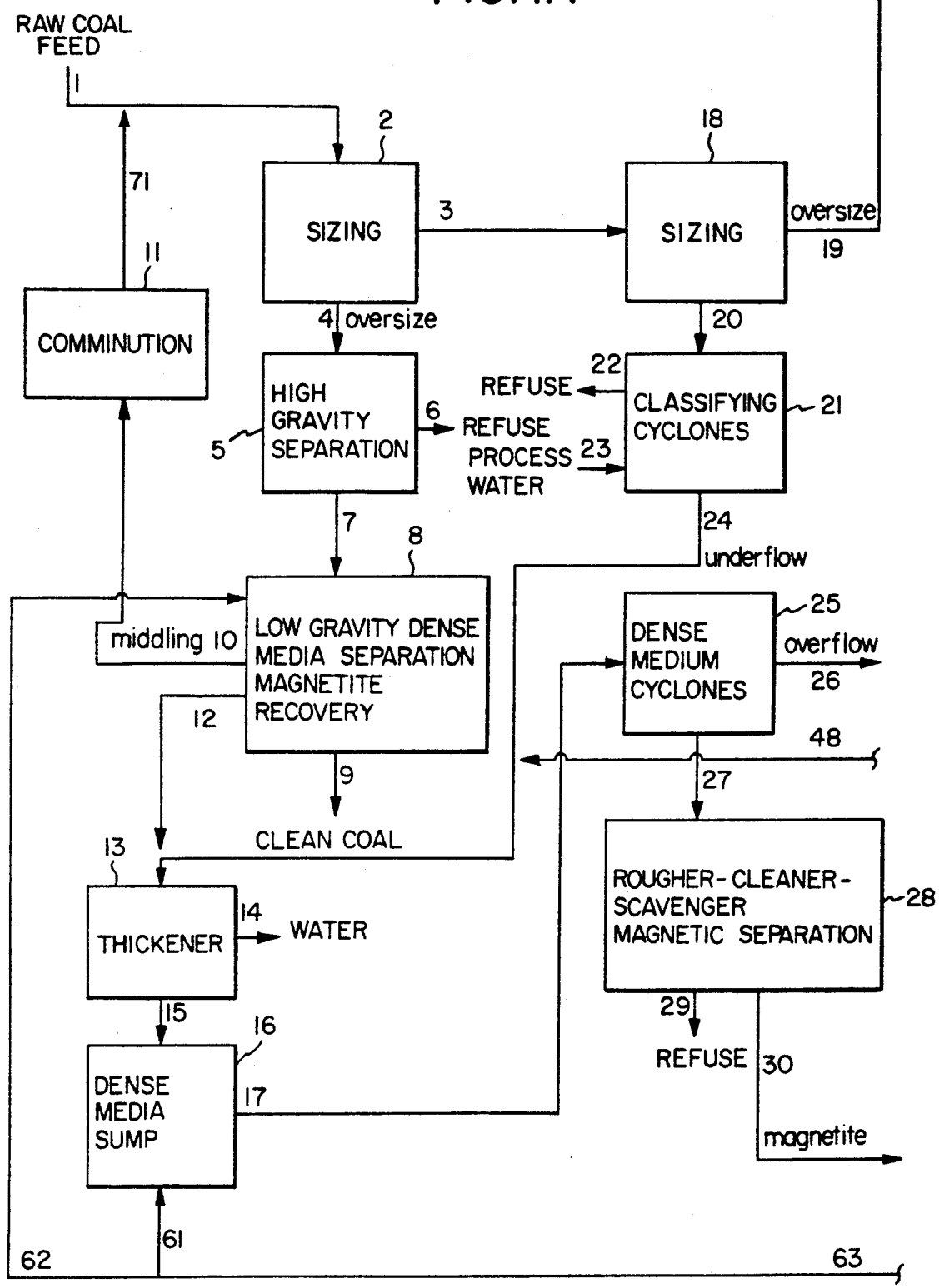
FIG. 1A and 1B are flow diagrams of an embodiment of the process of the present invention.

The present invention relates to a process of beneficiating fine particle coal through use of a dense medium separation process. In particular, the present invention involves a process for beneficiating particulate coal particles smaller than about 0.5 mm. The process of the present invention results in an exceptionally clean coal product with high heating value, low ash and low inorganic sulfur content. The process of the present invention can be used to produce a clean coal product which, during combustion, can meet desired emission specifications. It has been found that an improved coal product can be produced by application of one or more of the following methods, and preferably by application of each of the following methods.

LIBERATION

In one embodiment of the present invention, prior to beneficiation, substantially pure coal and high ash refuse are removed from the raw coal feed. Coarse coal (coal which is at least 0.5 mm in size) is relatively easy to clean and satisfactory cleaning processes are known in the industry. Cleaning of fine coal (coal which is less than about 0.5 mm in particle size) is more complex. For example, small particle coal is much more difficult to separate in dense medium cyclones because the small particles have large surface areas and experience high viscous drag, and because dense media have not traditionally been designed for such particles. Accordingly, it is preferable to remove clean coarse coal prior to beneficiation of coal fines.

A process for treating fine coal which incorporates comminution of coarse middlings to liberate coal from non-coal material is advantageous. Such a need is heightened by recent environmental concerns and regulatory impositions. Coal with high sulfur content will not be acceptable for electrical generation without expensive scrubbing. Comminution, however, is expensive; moreover, cleaning the resulting fines is costly. Comminution should, therefore, be minimized.

The process of the present invention provides an efficient and effective means for removing especially clean coal particles and refuse particles substantially barren of coal from a coarse coal feed. By removing coarse clean coal and refuse, only the middling fraction need be comminuted for further processing as fine particle coal. Thus, the process has the advantages of reducing the load on fine particle coal separation equipment, minimizing the cost of comminution and minimizing the amount of fines in the final clean coal product.

In the process of the present invention, raw coal feed is separated by size into coarse and fine fractions by any suitable method, preferably with screens. The separation is preferably made at a particle size from about 0.25 mm to about 1.0 mm, more preferably from about 0.6 mm to about 0.4 mm, and most preferably at a size of about 0.5 mm. The oversize coal is then subjected to dense medium separation, preferably by dense medium cycloning, at a low specific gravity such that an exceptionally clean coal product is removed as the overflow product. Preferably, the overflow product contains at least about 95 percent coal. Preferably, the density of separation is no more than about 0.1 specific gravity units in excess of the specific gravity of the pure coal being treated. The density of separation refers to the specific gravity for which there is an equal probability that a particle of feed having a density corresponding to that specific gravity will report to overflow or underflow. For example, for a 1.25 specific gravity bituminous coal, the density of separation should be less than about 1.35, preferably about 1.30, and for a 1.55 specific gravity anthracite coal, the density of separation should be less than about 1.65, preferably about 1.60.

The underflow product of this initial separation is preferably subjected to an additional dense medium separation, preferably by dense medium cycloning, at a high specific gravity such that non-coal material can be removed as the underflow product. Preferably, the gravity of separation of this second dense medium separation is at least about 0.5 specific gravity units in excess of the specific gravity of the pure coal, and more preferably at least about 0.75 specific gravity units in excess of the specific gravity of the pure coal. This underflow product is substantially free of coal and is discarded as refuse. Preferably, the underflow product contains less than about 25 percent coal, more preferably less than about 15 percent coal. In the alternative, the coal feed could be subjected to a high gravity separation followed by a low gravity separation.

The overflow product of the high gravity separation consists of middlings containing a combination of coal and non-coal materials such as pyrite and other ash-forming minerals. These coal and non-coal materials are locked together in the middling product. To liberate the coal from the non-coal material in the middlings, it is necessary to crush, grind or otherwise comminute the middlings to a fine particle size, preferably to less than about 0.5 mm in size. Following comminution, the liberated middlings are then processed with the fine particle coal initially sized away from the coarse fractions.

To assure that no coarse particles pass with the comminuted middlings to be processed with the fine particle coal, the comminuted middlings may be recycled to the raw coal feed stream so as to again pass through the initial sizing step. The undersize from the sizing step, including comminuted middlings, is then processed in a separation unit specifically designed to treat fine particle coal. If desired, prior to the low and high density separations, the coarse coal can be divided into multiple fractions by sizing, and these multiple fractions individually subjected to low and high density separations in order to liberate coal from non-coal material By processing coarse and fine coal separately, and by comminuting only the middlings, advantages, as previously mentioned are realized.

Figure 2:
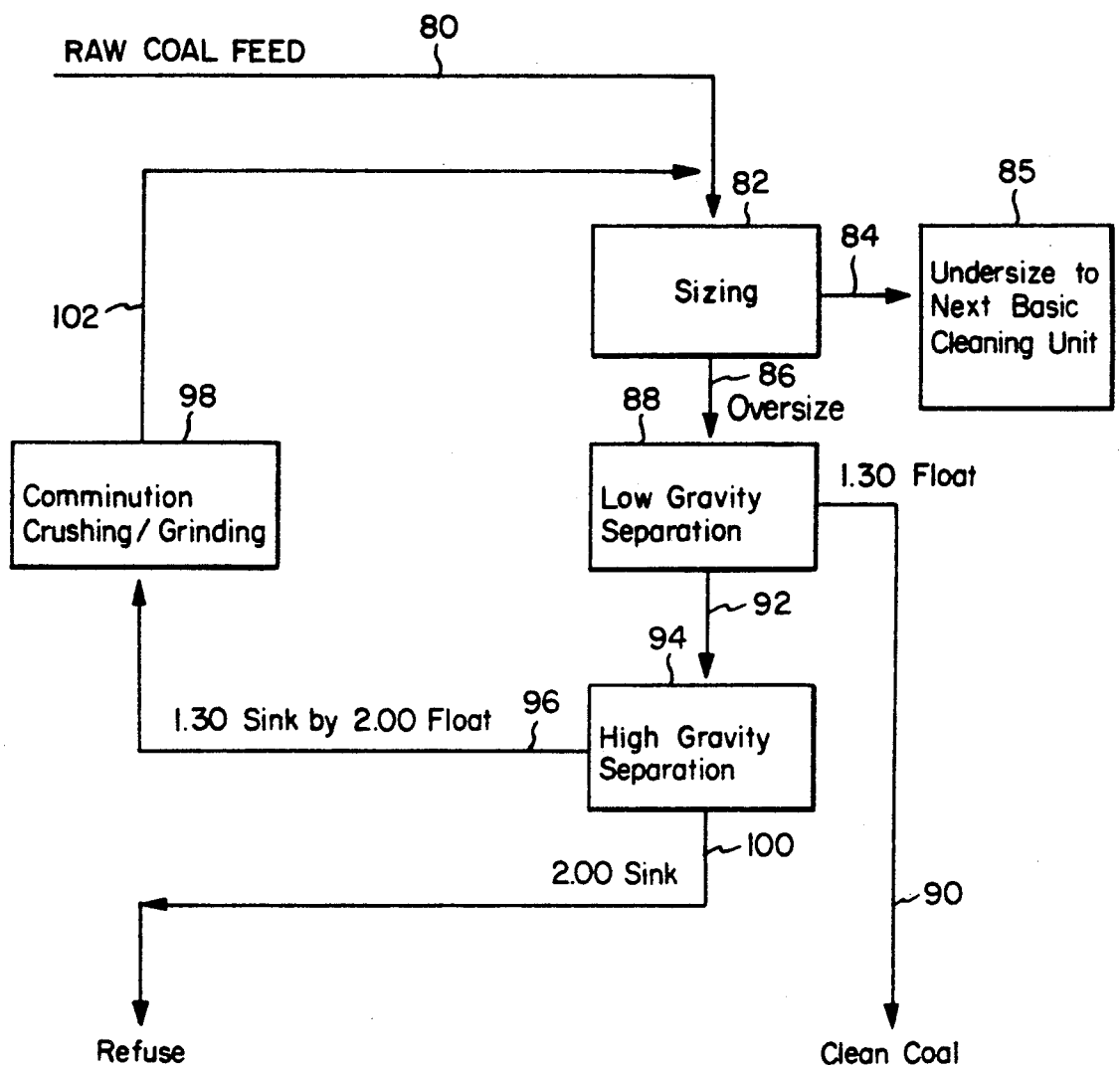
FIG. 2 is a flow diagram depicting the high density and low density separations of coarse coal yielding three products.

As illustrated in FIG. 2, clean coal and refuse are liberated from a raw coal feed. A raw coal feed 80 is sized 82 at 0.5 mm. The undersize 84 is recovered and sent to the dense medium cycloning circuit for small particle coal 85. The oversize 86, which is made up of plus 0.5 mm particles, is subjected to a first dense medium separation 88 at a low specific gravity of approximately 1.3. Clean coal 90 is removed as the float product of the first dense medium separation 88. The sink product 92 from the first dense medium separation 88 is subjected to a second dense medium separation 94 at a higher specific gravity of approximately 2.0. The high gravity sink product 100 is discarded as refuse. The float product 96 of the second dense medium separation 94 is subjected to comminution 98. The comminuted product 102 is subjected to additional sizing 82 until the entire coal feed is less than about 0.5 mm in size and, therefore, reports to the dense medium cycloning circuit for small particle coal 85.

SIZING AND CLASSIFICATION

In another embodiment of the present invention, fine particle coal feed is partitioned into various size fractions prior to cleaning. Cleaning performance is improved in processes based on specific gravity separation such as dense medium cycloning when a narrow size distribution of coal feed particles is processed. An effective means of partitioning fine size coal into extremely fine size fractions allows for more efficient separation for fine size coal.

Prior to partitioning, the coal feed is made up of fine size coal. The fine size coal feed is preferably sized to be smaller than from about 0.25 mm to about 1 mm, more preferably smaller than from about 0.4 mm to about 0.6 mm and most preferably smaller than about 0.5 mm. Preferably, the coal feed is the undersize product of the above-described liberation process.

In the process of the present invention, coal is divided into at least three size fractions, and preferably into three size fractions, to facilitate subsequent magnetite recovery and to improve cyclone cleaning performance. Specifically, the coal is preferably classified at a size from about 0.044 mm to about 0.150 mm, more preferably at a size from about 0.085 mm to about 0.125 mm and most preferably at a size of about 0.105 mm (150 mesh) by any suitable method such as through use of a fine aperture sieve, preferably a Krebs Varisieve ™. Coal smaller than the above sizes, most preferably smaller than about 0.105 mm, is further classified at a size which allows for the discard of the smallest size fraction such that an improved clean coal product can be recovered. Classification at a size preferably from about 0.037 mm to about 0.005 mm, more preferably from about 0.025 mm to about 0.01 mm and most preferably at about 0.015 mm will usually result in the removal of clay slimes which are detrimental if present in sufficient quantities in the clean coal product.

In the past, particles of a certain small size have been removed from coal feeds prior to beneficiation because of process limitations such as the loss of dense medium cyclone cleaning performance with a fine particle feed. Removal of the smallest size fraction involved the removal of relatively large size particles as compared to the present invention. In the present invention, only an extremely small size fraction of coal is discarded, for example, slimes less than about 0.015 mm in size.

In general, slimes smaller than about 0.015 mm are difficult to separate by dense medium separation and are usually a discard product during beneficiation. Removal of these slimes prior to dense medium separation has the advantage of removing high ash containing particles in a relatively uncomplicated process, together with the advantage of reducing the load on the dense medium separation equipment. In addition, clay slimes undesirably increase the water retention of cleaned coal, inhibit the recovery of magnetite from the dense medium and, when combusted, cause slagging in the boiler.

In one embodiment of the present invention, removal of particles smaller than about 0.015 mm from the fine coal feed is accomplished through the use of a classifying cyclone. Preferably, the classification circuit consists of a series of classifying cyclones, and more preferably, the classifying cyclones are arranged in a counter-current flow circuit. It is an advantage of the present process that the removal of extremely small size particles by classification in classifying cyclones can be conducted in high throughput capacity, 10" diameter cyclones rather than smaller diameter cyclones, such as 1" or 2" diameter cyclones, traditionally used to classify extremely small size particles.

When a classifying cyclone is used to classify extremely small size coal particles, such as particles 0.015 mm in size, most particles larger than the classification size report to the underflow product and most smaller particles distribute in the same proportion as the process water. When multiple classifying cyclones are used, preferably at least three in series, it is also preferable to have the classifying cyclones connected in a counter-current flow arrangement so as to run the flow of process water in a direction opposite to the progression of the raw coal particles. For example, the underflow from a primary classifying cyclone containing coarse coal particles moves to a secondary classifying cyclone, and the underflow of the secondary classifying cyclone containing coarse coal particles moves to a tertiary classifying cyclone. The overflow of the classifying cyclones containing water and clay slimes is the reverse, namely the overflow from the tertiary classifying cyclone flows to the secondary classifying cyclone, the overflow from the secondary classifying cyclone flows to the primary classifying cyclone, and overflow from the primary classifying cyclone is sent to the refuse thickener for discard. In this fashion, the cleanest water is used in the classifying cyclones with the coal containing the least clay slimes and the dirtiest water is used to disengage the heaviest clay slimes.

Figure 3:
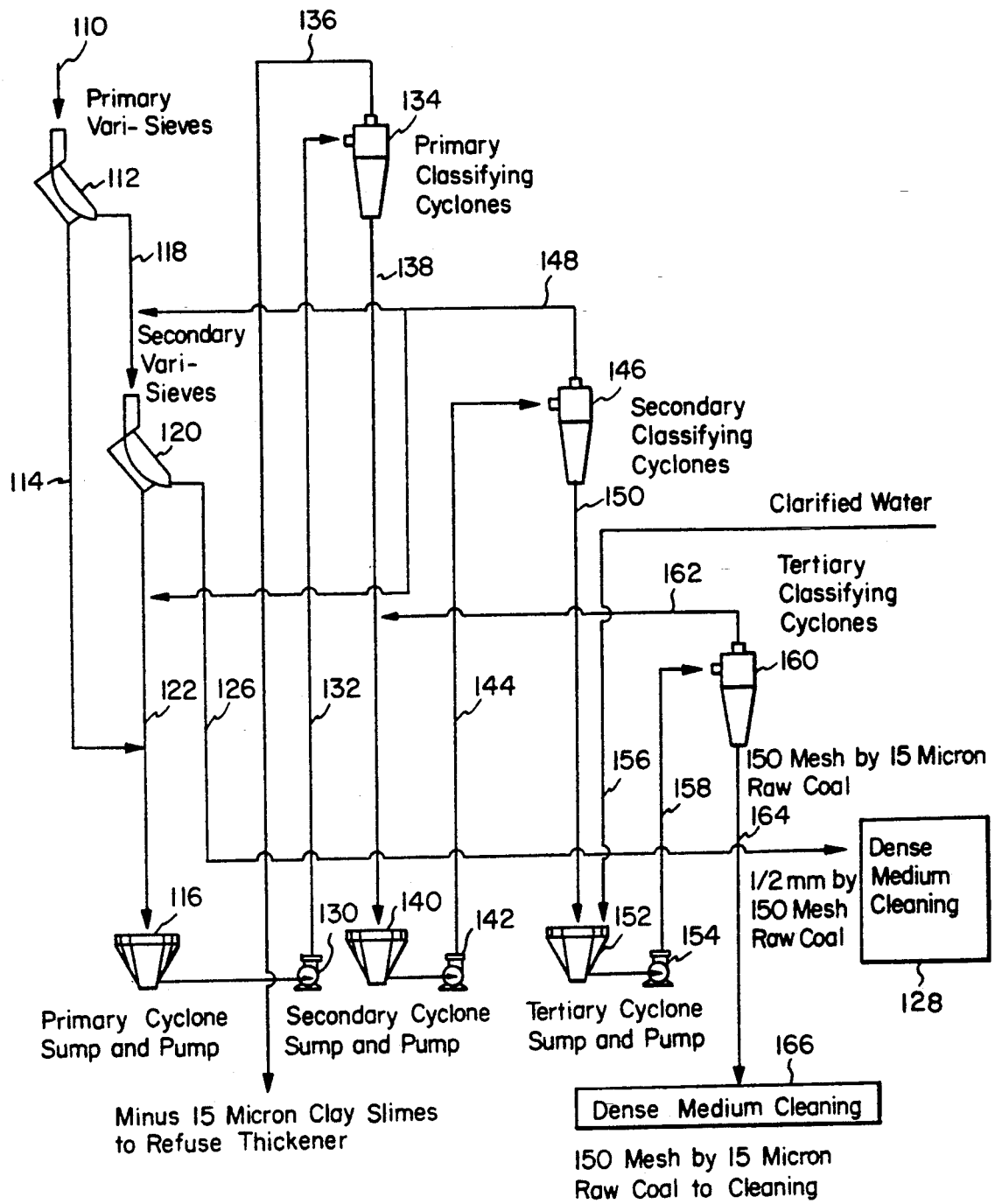
FIG. 3 is a flow diagram depicting the sizing of a coal feed into three fractions based on size.

As illustrated in FIG. 3, raw coal 110 reports to a primary VariSieve ™ 112 for sizing at 150 mesh (0.105 mm). The primary underflow 114 reports to a primary sump 116. The primary overflow 118 reports to a secondary sieve 120 for further sizing at 150 mesh. The secondary underflow 122 also reports to the primary sump 116 which now contains minus 150 mesh raw coal. The secondary overflow 126 is recovered and sent to a dense medium cycloning circuit for the larger-particle-size coal 128.

The minus 150 mesh raw coal from the primary sump 116 reports to a primary pump 130, which pumps the primary feed 132 to a primary classifying cyclone 134 for further sizing at 15 microns (0.015 mm). The primary classifying cyclone 134 overflow 136 which now contains clay slimes is discarded as refuse. The primary classifying cyclone 134 underflow 138 reports to a secondary sump 140 serviced by a secondary pump 142. The secondary pump feed 144 reports to a secondary classifying cyclone 146 for further separation at 15 microns. The secondary classifying cyclone 146 overflow 148 splits. Part combines with the primary VariSieve ™ 112 overflow 118 for further processing through the secondary sieve 120. The remainder of the secondary overflow 148 joins underflow 122 thence to the primary sump 116. The secondary classifying cyclone 146 underflow 150 reports to a tertiary sump 152 serviced by a tertiary pump 154. Clarified water 156 is added to the tertiary sump 152. The tertiary pump feed 158 reports to a tertiary classifying cyclone 160 for further sizing at 15 microns.

The tertiary classifying cyclone 160 overflow 162 combines With the primary classifying cyclone 134 underflow 138 for further processing. The tertiary classifying cyclone 160 underflow 164, which is made up of 150 mesh by 15 micron size particles, is recovered and sent to the dense medium cycloning circuit for the smaller-particle-size coal 166.

DENSE MEDIUM CYCLONING

A. Cyclone Design Parameters

In accordance with an embodiment of the present invention, coal less than 0.5 mm in size is beneficiated in a dense medium cyclone having specific modifications to the design of the cyclone to overcome problems associated with cleaning fine size coal particles. A problem with conventional cyclones is that the acceleration of coal and refuse particles inside the cyclone is too weak to impart an adequate velocity to the fine size particles and, as a result, such particles report inappropriately to either the underflow or the overflow. The weakness in separations conducted in conventional cyclones is that smaller coal and refuse particles have greater fluid resistance or hydraulic drag than larger particles. This problem is also encountered in classification of extremely small particles based on size in classifying cyclones. To be properly separated, a greater acceleration force needs to be imparted to the particles to overcome the counter effect of increased drag.

Accordingly, in one embodiment of this invention, an improved process of beneficiating fine size coal by dense medium cycloning has been developed. In this embodiment, the cyclone geometry, particularly the inlet area for flow into the cyclone feed chamber, is modified from conventional cyclones such that it is less than about 0.01 times the square of the inside chamber diameter. Preferably, the inlet area for flow is not greater than 0.0096 times the square of the inside diameter of the cyclone feed chamber and is not less than 0.0048 times the square of the inside diameter of the cyclone feed chamber. Decreasing the inlet diameter, while maintaining the same flowrate as before decreasing the inlet diameter, increases the inlet velocity of the feed which in turn increases the acceleration force the particles experience inside the cyclone. Increasing the acceleration of the particles in the cyclone improves separation efficiency. In a preferred embodiment, beneficiation occurs in a cyclone where the inside diameter of the cyclone feed chamber is about 10 inches and the inlet area for flow is not greater than about 0.96 square inches nor less than about 0.48 square inches.

Similar relationships between inlet area for flow and cyclone feed chamber diameter have been found to improve classification performance in cyclones classifying extremely small particles based on size. As with dense medium separation of coal and non-coal materials, the efficiency of cyclone classification systems used to separate different size particles increases with increased acceleration of the particles, other parameters being equal.

An advantage of the present invention is that fine particle coal can be effectively cleaned using a dense medium beneficiation process without the use of froth flotation systems which are difficult to maintain. As compared to froth flotation, dense medium cycloning provides advantages with respect to separation efficiency because not all coals float in froth flotation. In addition, in froth flotation, pyrite tends to float with clean coal, thereby contaminating the clean coal product with sulfur contained in the pyrite.

In general, increased particle acceleration improves the separation efficiency of small particle coal, however, increasing particle acceleration without decreasing inlet area also tends to decrease the residence time of the particles in the cyclone. Excessively short residence times decrease the efficiency of separations. In a preferred embodiment of the present invention, the inlet velocity is at least 30 ft/sec, more preferably 60 ft/sec and most preferably 90 ft/sec. The cyclone throughput is selected to provide sufficient residence time to achieve effective separation. Preferably, the throughput is approximately the industry design standards throughput for a particular cyclone. Once the appropriate inlet velocity and throughput have been selected, the inlet area can be determined using the relationship: throughput = inlet area x inlet velocity. As will be appreciated by one skilled in the art, during actual operation of a cyclone, throughput is often calculated based on flow pressure measurements, using well known relationships.

B. Use of Ultra-fine Magnetite as Dense Media

In dense medium beneficiation processes, it is advantageous to select materials for use as the dense medium which are easy to remove from coal or refuse after beneficiation. In this manner, the dense medium materials can be recycled and reused numerous times. If magnetic particles are selected for use in the dense medium, after beneficiation these particles can be recovered for reuse utilizing a process which takes advantage of their small size and magnetic susceptibilities. Magnetic particles as used herein are those particles capable of being effectively separated by magnetic means, and include ferromagnetic or ferrimagnetic particles, such as magnetite, ferrosilicon and maghemite.

As noted, dense media used in dense medium separation processes usually contain magnetic particles suspended in water. The suspension of magnetio particles floats solid particles to be separated similar to a dense homogeneous fluid so long as the size of the particles to be separated are considerably larger than the magnetic particles in the dense medium.

A problem with dense medium cleaning of small size particles has been the tendency of clean coal particles to inappropriately report to the refuse underflow of the cyclone. This problem is caused by the decreasing size difference between the coal particles to be separated and the particles of the dense medium. As the coal particles become smaller relative to the particles of the dense medium, the coal particles to be separated tend to loose buoyancy and therefore sink. The dense medium ceases to float particles to be separated in a manner similar to a homogeneous dense fluid. As such, ultra-fine size dense medium particles are necessary to effectively separate fine particle size coal from refuse.

It is an unexpected result of the present invention that dense medium separation of fine particle coal is also improved by maintaining the size distribution of ultra-fine magnetite particles within a narrow range of sizes. Such narrow distribution of magnetic particle sizes also results in enhanced recovery of the magnetic particles following dense medium separation.

In one embodiment of the present invention, the dense medium is made up of water and a suspension of ultra-fine magnetic particles, preferably magnetite particles. Preferably, at least about 65 weight percent of the magnetic particles are from about 2 microns to about 10 microns in size and no more than about 10 weight percent of such magnetic particles are smaller than about 2 microns in size. More preferably, at least about 75 weight percent of the magnetic particles are from about 2 microns to about 10 microns in size, no more than about 10 weight percent of such magnetic particles are smaller than about 2 microns in size, no more than about 25 weight percent of the magnetic particles are smaller than about 3 microns in size and at least about 10 weight percent of the magnetic particles are larger than about 7 microns in size.

C. Production of Ultra-fine Magnetite

In one embodiment of the present invention, an ultra-fine magnetite is produced for use in connection with dense medium beneficiation of coal feed with a particles sized at less than about 0.5 mm. Commercially prepared magnetite is too large to effectively separate fine particle size coal and refuse. To effectively separate coal down to about 0.015 mm, magnetite particles are preferably less than about 0.010 mm in size, and preferably with at least about 50 percent of the particles less than about 0.005 mm in size. It has been found that a superior magnetite, with most particles smaller than about 0.010 mm and preferably at least about 90 percent below about 0.010 mm, can be produced by the process of this invention.

Two processes for producing ultra-fine magnetite are:

1) spray-roasting a solution of ferrous chloride in air to produce hematite by pyrohydrolysis, followed by chemically reducing hematite to magnetite. The chemical reactions for this process are:

(a) production of hematite by pyrohydrolysis of iron chloride:

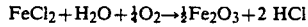
   $FeCl_2 + H_2O + \tfrac{1}{2}O_2 \rightarrow \tfrac{1}{2}Fe_2O_3 + 2\ HCl$ (b) Reduction of hematite to magnetite by the use of either hydrdgen or carbon monoxide, or both:

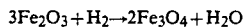
   $3Fe_2O_3 + H_2 \rightarrow 2Fe_3O_4 + H_2O$

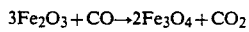
   $3Fe_2O_3 + CO \rightarrow 2Fe_3O_4 + CO_2$ 2) spray-roasting a solution of ferrous chloride in restricted air directly to magnetite by pyrohydrolysis. The chemical reaction for this process is:

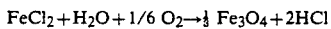
   $FeCl_2 + H_2O + 1/6\ O_2 \rightarrow \tfrac{1}{3} Fe_3O_4 + 2HCl$ It is preferable that the ratios of concentrations of product gas to reactant gas are limited such that the reduction of hematite to magnetite does not proceed beyond magnetite to ferrous oxide, FeO, or even metallic iron.

Preferably, the magnetite particles are produced by the reduction of hematite or the direct pyrohydrolysis to magnetite under reducing conditions, including residence time and temperature, designed to control crystal growth of the magnetite which is produced. The resulting magnetite particles preferably have the narrow size distribution set forth above in Section B.

In one embodiment of the invention, ferrous chloride is spray-roasted in air to form hematite by pyrohydrolysis. Hematite produced by spray-roasting is then reduced to magnetite at a temperature and for a period of time sufficient to limit magnetite crystal growth. Preferably, reduction of the magnetite occurs at a temperature of from about 900° C. to about 1000° C., and more preferably from about 980° C. to about 1000° C., for a period of time to produce magnetite crystal growth which results in a narrow size distribution of magnetite particles without decreasing the separation efficiency of a dense medium separation process employing the magnetite. Preferred size distributions are set forth hereinbefore in Section B.

Any suitable reactor for the reduction of hematite to magnetite can be used, such as rotary kiln reactors. In a preferred embodiment, the spray-roasted hematite is pelletized prior to reduction to magnetite. Pelletization avoids the problem of the hematite being blown out of the reactor prior to reduction to magnetite.

Preferably, hematite is reduced to magnetite with carbon monoxide and hydrogen with the flow of reducing gases countercurrent to the flow of hematite pellets which are fed into the reactor opposite the burner flame, and which are heated to greater temperatures as the pellets move through the reactor chamber, attaining maximum temperature near the product discharge. Reducing conditions are preferably maintained throughout the reactor, such as by injection of additional reducing gas into the reactor near the product discharge end.

In a preferred embodiment, the magnetite pellets are broken up by comminution or attrition scrubbing to provide magnetite particles having a size on the order of the natural grain size of the magnetite after reduction. As will be appreciated, the preferred size distributions for the magnetite particles set forth in Section B above are the sizes of the particles as broken up. It is also preferable to remove any soluble chlorides, especially alkaline earth chlorides which are not volatile, from the magnetite by, for example, countercurrent washing or through washing during attrition scrubbing.

Magnetite produced by the process of this invention results in several advantages when used in connection with the beneficiation of small particle coal. Specifically, magnetite produced by this process can be more easily recovered magnetically, thereby reducing the cost of beneficiation by reducing magnetite loss and the amount of magnetic separation equipment required. Also as a result of the ease of recovering the magnetite, operating costs are reduced. In addition, the magnetite particles produced by the process of this invention have a narrow size distribution (the size of most particles is close to the median particle size and relatively few particles are substantially smaller or larger than the mean particle size). This narrow size distribution results in improved separation efficiency in the dense medium beneficiation process.

RECOVERY OF MAGNETIC PARTICLES

In another embodiment of the present invention, magnetic particles, preferably magnetite, are recovered separately from the clean coal and refuse fractions after beneficiation. Preferably, different approaches for magnetic particle recovery are applied to cleaned fractions composed of particles of different size ranges.

A drain and rinse approach followed by magnetic separation is applied to recover magnetic particles from the rinse water from a fraction containing larger-size coal or refuse particles, such as a fraction containing particles smaller than about 0.4 mm to about 0.6 mm, and larger than about 0.085 mm to about 0.125 mm. The majority of the magnetite is recovered from this larger-particle-size fraction as it flows across sieves, preferably a series of at least two sieves and most preferably a series of three sieves. Draining is followed by rinsing with clean process water, preferably employing a countercurrent system where the flow of rinse water is countercurrent to the flow of coal or refuse particles. Preferably, additional magnetite and moisture are removed from the coal on a final vibrating screen followed by recovery of the magnetic material from the dilute or rinsed stream. It is preferable that the coal and refuse fractions from which the medium has been drained are repulped through the addition of water and then sent to the next sieve where the bulk of the water passes through the sieve carrying the bulk of the magnetite. The drained medium from the first sieve containing magnetite and water can be recycled directly to a dense sump for use as the dense medium in dense medium cyclones.

Recovery by the drain and rinse approach of magnetic particles less than about 0.01 mm in size from a fraction of coal or refuse containing smaller-sized-coal or refuse particles, such as a fraction containing particles smaller 0.01 mm to 0.02 mm, is more difficult because sieves or screens which produce a size separation for industrial quantities in the 0.01 mm to 0.07 mm size range are generally not available.

According to an embodiment of this invention, magnetic particles, preferably magnetite particles, are recovered from a smaller-particle-size fraction of refuse and coal in a series of magnetic separators specially adapted for the recovery of ultra-fine magnetic particles. This recovery scheme is identified as a rougher-cleaner-scavenger circuit. The rougher is one or more wet drum magnetic separators, preferably three wet drum separators in series, having standard strength magnets such as barium ferrite magnets.

The coal or refuse stream is initially run through the magnetic separators comprising the rougher step. Preferably, the coal or refuse feed to the rougher step is diluted with a recycle stream of non-magnetic particles from the cleaner separator. Dilution improves magnetite recovery from the smaller-particle-size fractions of coal or refuse.

Non-magnetic effluent water from the magnetic particle recovery process for the larger-particle size fractions of coal or refuse still contains small quantities of both coal and magnetic particles, which can be removed by combining said effluent with the smaller-particle-size process stream prior to magnetic recovery, preferably prior to dense media separation of the smaller-particle-size stream.

The magnetic concentrate separated out by the magnets of the rougher stage is diluted with water and then sent to a cleaner stage which is made up of wet drum magnetic separators which contain standard strength magnets such as barium ferrite. The magnetic concentrate separated out in the cleaner stage is recycled for makeup of dense media to be used in dense medium separation. The non-magnetic effluent exiting the cleaner stage can be recycled as dilution water to dilute feed to the rougher unit.

Finally, the non-magnetic effluent from the rougher and cleaner stages including the coal or refuse particles, and still containing a small amount of magnetic particles, is sent to the scavenger stage. The scavenger stage includes wet drum magnetic separators containing magnets stronger than those used in the rougher and cleaner stages. Preferably, the magnets used in the scavenger contain rare earth magnets. Preferably, the drum of the scavenger separator has been positioned to bring the magnetic particles closer to the magnet by narrowing the gap in the magnetic separator.

The magnetite recovery process of this invention is advantageous in that the least expensive method of recovery, namely drain and rinse, is applied where possible, while the more expensive rougher-cleaner-scavenger circuit is used to recover only the finest magnetite.

Figure 4:
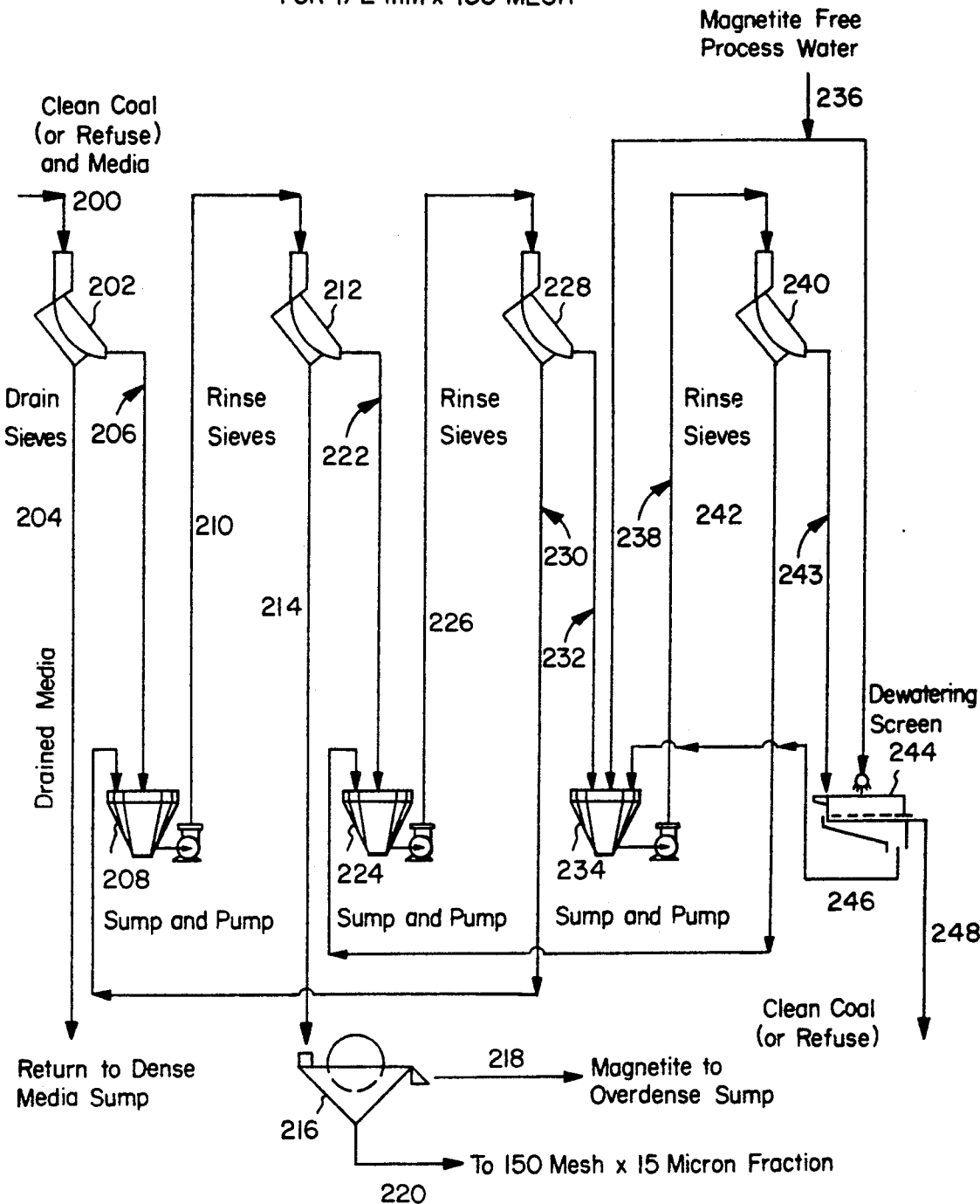
FIG. 4 is a flow chart schematically depicting the magnetite recovery circuit for a larger-particle-size fraction of minus 0.5 mm coal feed following dense medium separation.

FIG. 4 depicts a magnetite recovery circuit following dense medium separation of larger-particle-size coal or refuse fractions. For example, a fraction of 0.5 mm by 150 mesh (0.105 mm) coal or refuse could be processed by this circuit. The circuit includes a series of rinse sieves with process water flowing between the sieves in flow countercurrent to the flow of coal or refuse. Referring to FIG. 4, the coal or refuse fraction from dense medium cycloning 200 feeds to the first sieve 202 where dense media drains from the coal or refuse. The drained media 204 returns to the dense media sump for reuse. The oversize coal or refuse 206 then goes to a sump 208, where the coal or refuse is repulped with water and the resulting slurry 210 is pumped to the first rinse sieve 212 where water and magnetite particles 214 drain from the coal or refuse. A spray rinse to remove additional magnetite could also be incorporated The drained water and magnetite 214 go to a wet drum magnetic separator 216 where a magnetite concentrate 218 is recovered and sent to the overdense media sump for reuse. Cleaned effluent 220, which still contains a small quantity of magnetite, from the magnetic separator can be mixed with a smaller-particle-size coal feed fraction, such as a 150 mesh (0.105 mm) by 15 micron (0.015 mm) fraction for example, preferably reports to a thickener (not shown) and then dense medium separation of that fraction. Remaining magnetite is therefore recovered from the smaller-particle-size fraction.

From the first rinse sieve 212, the oversize coal or refuse 222 is then repulped with water in sump 224 and the resulting slurry 226 is pumped to the second rinse sieve 228, where water and magnetite 230 are drained from the coal or refuse. The drained water and magnetite 230 are used for repulping in the first sump 208.

From the second rinse sieve 228, the oversize coal or refuse 232 goes to sump 234 and is repulped with clean process water 236 and the resulting slurry 238 is then pumped to a third rinse sieve 240 where magnetite and water 242 drain and then go to sump 224 as repulping liquid.

From the third rinse sieve 240, the oversize coal or refuse 243 goes to a dewatering screen 244 where clean process water 236 is sprayed onto the screen to dislodge and rinse away remaining magnetite. The rinse water containing magnetite 246 is then used as repulping liquid in the third sump 234. The coal or refuse product 248 is removed as oversize from the dewatering screen 244.

Figure 5:
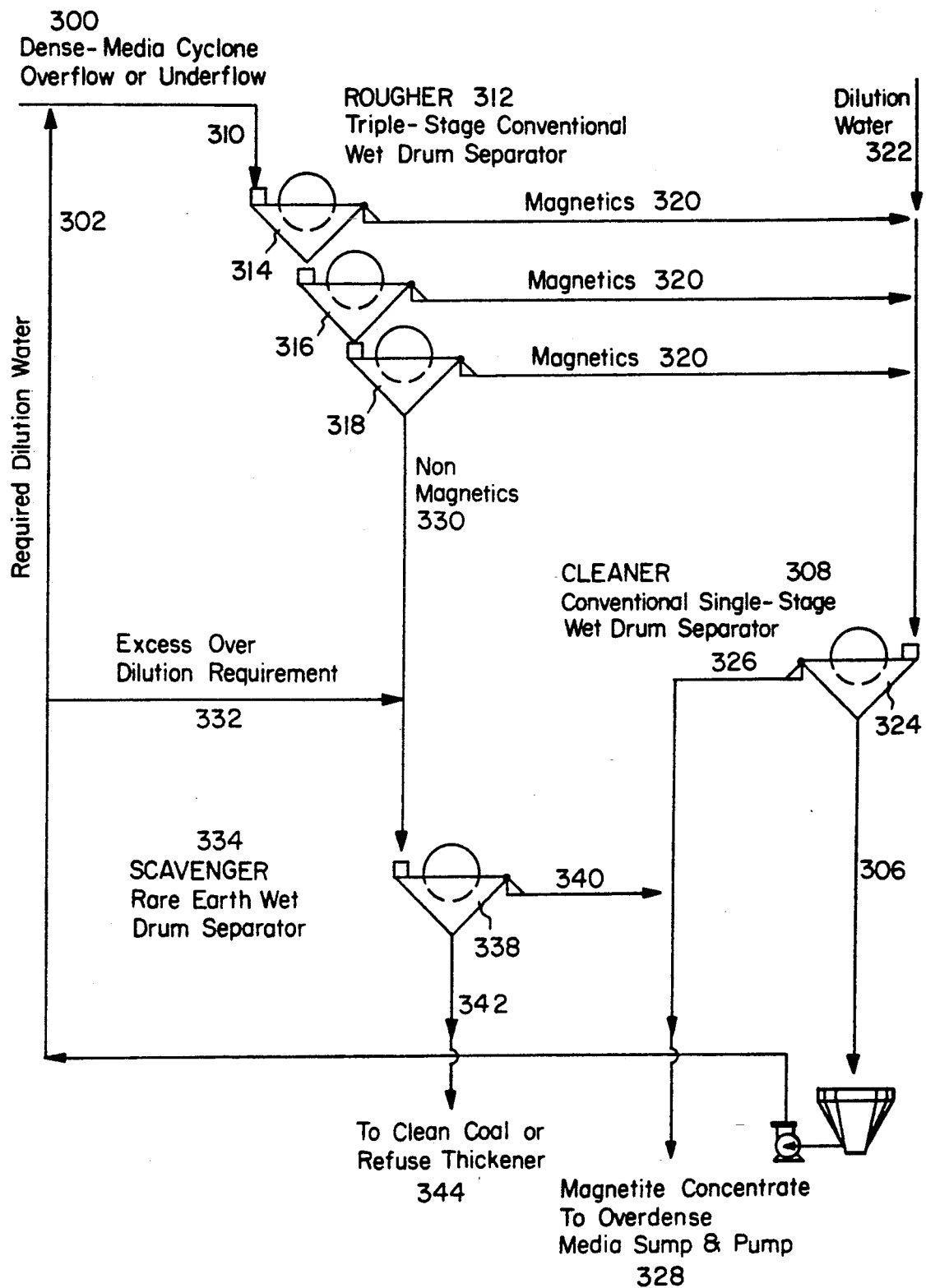
FIG. 5 is a flow chart schematically depicting the magnetite recovery circuit for a smaller-particle-size fraction of minus 0.5 mm coal feed following dense medium separation.

FIG. 5 illustrates a magnetite recovery circuit which follows dense medium separation of smaller-particle-size coal or refuse fractions. For example, a fraction of 150 mesh (0.105 mm)×15 micron (0.015 mm) coal or refuse could be processed in this circuit. Referring to FIG. 5, smaller-particle-size coal or refuse 300 from a dense medium cyclone is diluted with dilution water 302. The dilution water 302 can originate from a number of sources, for example, from non-magnetic effluent 306 from the cleaner stage 308 of the present process or fresh or recycle water (not shown).

The diluted dense media cyclone overflow (coal) or underflow (refuse) 310 enters the rougher stage 312 and passes through three wet drum separators 314, 316, 318. Preferably the wet drum separators have standard strength magnets, such as barium ferrite magnets. The magnetics 320 are diluted with dilution water 322 and sent to cleaner stage 308 for processing by a wet drum separator 324. Preferably, the wet drum separator 324 contains a standard strength magnet. The magnetic concentrate 326 is sent to a magnetic concentrate overdense media sump and pump where it can be recycled for use in subsequent dense medium separations. As previously stated, the non-magnetic effluent 306 exiting the cleaner stage 308 can be employed as dilution water 302 for the dense media cyclone overflow (coal) or underflow (refuse) 300. The excess not required for dilution 332 can be sent to a scavenger stage 334 along with the non-magnetic effluent 330 from the rougher stage 312. In the scavenger stage 334 a wet drum separator 338 employing a strong magnet, such as a rare earth magnet, is employed to separate the remaining magnetics 340 from the clean coal or refuse 342. The magnetics 340 from the scavenger stage 334 can be recycled 328 for use in dense medium separations. The clean coal or refuse 342 can be sent to a thickener 344.

DEWATERING AND AGGLOMERATION

In another embodiment of the present invention, after recovery of magnetite from the clean coal product, the coal is dewatered using conventional methods such as centrifuge or vacuum filtration. Dewatering to reduce coal moisture content is advantageous prior to combustion of coal. In a preferred embodiment, paper fibers, preferably newsprint fibers, are added to a coal and water slurry prior to dewatering clean coal fractions. Preferably, the size of coal particles in the fraction is less than from about 0.085 to 0.125 mm and greater than from about 0.010 to 0.020 mm. The addition of paper fibers results in several improvements to the dewatering process, particularly including: (1) increased moisture reduction during dewatering, (2) improved strength of coal pellets produced by agglomerating with binder, or equal strength coal pellets with less binder, (3) improved ignition of the coal, (4) increased, BTU's, and (5) an environmental advantage from a beneficial use of paper waste.

In another embodiment of the present invention, the clean coal product, particularly a smaller-particle-size fraction, is subjected to agglomeration using suitable agglomeration techniques.

Figure 1B:
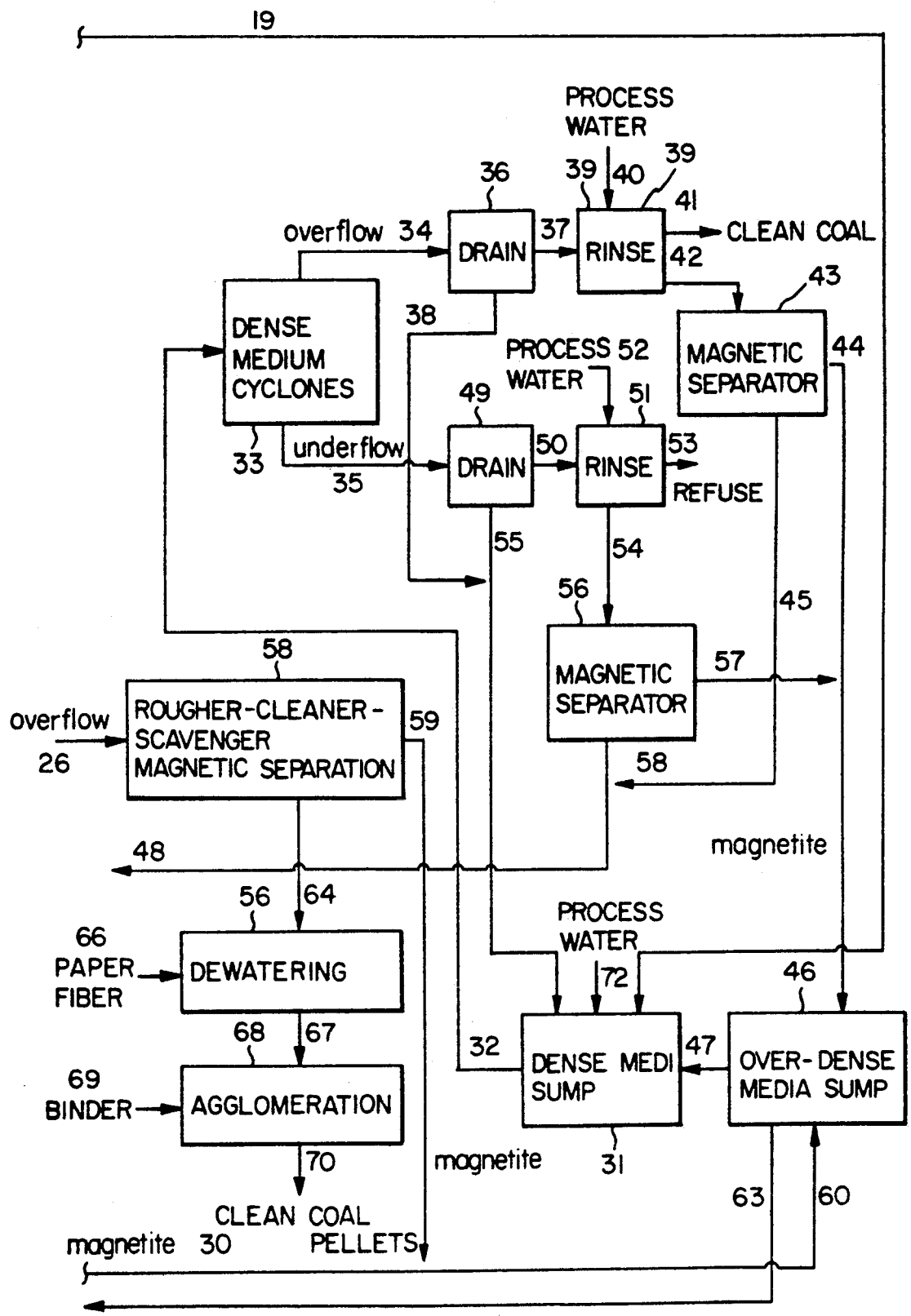

FIGS. 1A and 1B depict process flow for one embodiment of the invention. Raw coal feed 1 sized in the first sizing unit 2, by sieves, screens, or other suitable methods. Oversize particles 4, those over 0.5 mm in size, for example, are then sent to a high gravity separation unit 5 which unit involves density separation by jigs, dense medium or other suitable methods. Sink from the high gravity separation unit 5 is discarded as refuse 6. Float 7 then goes to a low density separation unit 8 where dense medium separation occurs. Float exits as a clean coal product 9, ultra-fine magnetite 62 is added as needed. Sink from the low gravity separation unit 8 constitutes middlings 10 which are sent to a comminution unit 11 where the middlings are crushed, ground, or otherwise comminuted, and the comminuted middlings 71 are then combined with the raw coal feed 1 for further processing.

Magnetite is recovered by any suitable method following low gravity separation and recovered magnetite and water 12 are sent to a thickener 13 where water 14 is removed. The thickened magnetite with some water 15 then goes to the dense media sump 16.

Undersize 3 from the first sizing unit 2 is sent to a second sizing unit 18 where particles are sized by sieve, screen, or other known methods. Undersize 20, for example minus 150 mesh (0.0105 mm) particles then goes to a classifying cyclone circuit 21 designed to classify at an ultra-fine particle size, at 15 microns (0.015 mm) for example. The slimes exiting with the overflow are discarded as refuse. Process water 23 is added to the classifying cyclone circuit 21, which is operated in countercurrent flow. Underflow 24, is sent to the thickener 13 where the underflow is thickened along with magnetite from the low density separation unit The thickened slurry 15 then goes to the dense media sump 16 where ultra-fine magnetite 61 is added as needed. Slurry 17 from the dense sump 16 goes to dense medium cyclones 25 for dense medium separation. Overflow 26 containing clean coal then goes to a magnetic separation unit 58 where magnetite is removed in wet drum magnetic separators in a rougher-cleaner-scavenger arrangement, with a rare earth magnet incorporated into the scavenger separator to enhance magnetite recovery. The clean coal 64 then goes to a dewatering unit 56 where paper fibers 66 are added to the coal prior to dewatering by centrifuge. The dewatered coal 67 then goes to an agglomeration unit 68 where the coal is pelletized with the aid of a binder 69 if needed. Clean coal pellets 70 exit as a final product. Underflow 27 from the dense medium cyclones 25 containing refuse goes to a magnetic separation unit 28 which operates the same as the magnetic separation unit 58 previously described for the overflow. Magnetite-free refuse 29 exits the magnetic separation unit 28 to be discarded.

Concentrated magnetite 30 and 59 from the magnetic separation units 28 and 58 combine 60 and go to the over-dense media sump 46. Over-dense media 47 from the over-dense media sump goes to the dense medium sump 31. Over-dense media 63 is also sent to the low gravity separation unit 8 and dense media sump 16 as needed.

Oversize 19 form the second sizing unit 18, for example 0.5 mm by 150 mesh (0.105 mm) particles go to dense medium sump 31, where process water 72 and over-dense medium 47 are added to establish the proper slurry density. Magnetite used in the dense medium sump 31 is of ultra-fine particle size, with over 60 percent of the particles between 10 microns and 2 microns in size.

Slurry 32 from the dense medium sump 31 goes to dense medium cyclones 33 for dense medium separation. Overflow 34 is first drained 36 over a sieve and the oversize clean coal 37 is then rinsed 39 over screens with process water 40 added. Clean coal product 41 exits from the rinsing stage 39.

Rinse water containing magnetite particles 42 is then processed in a magnetic separation unit 43 containing one or more wet drum magnetic separators, where magnetite is removed from the water.

Magnetite from underflow 35 from dense media cyclones 33 is recovered similarly to magnetite recovery from overflow 34, just described. Magnetite and water are drained 49 with drain liquid 55 being combined with drain liquid from the overflow 38 and then being sent to the dense medium sump 31. The oversize refuse 50 is rinsed 51 with process water 52. Oversize refuse 53 then exits the rinsing circuit, to be discarded. Rinse water containing magnetite 54 goes to a magnetic separation unit 56 containing one or more wet drum magnetic separators. Water 58 and 45 exiting the magnetic separation units, which still contains small amounts of magnetite, combine 48 and go to the thickener 13, from which the magnetite continues in the process flow as previously described and is ultimately recovered.

EXAMPLE 1

Magnetite Production

Magnetite was produced by the reduction of hematite in kiln reactors at two different temperatures. The hematite feed had been previously produced by spray roasting of iron chloride in a pyrohydrolysis reaction. The hematite was fed into one end of the kiln and magnetite product was recovered from the opposite end of the kiln. The hematite was heated as it moved through the kiln and reached maximum temperature near the discharge end. Either hydrogen gas or natural gas was injected into the kiln to insure a reducing environment throughout the kiln. The magnetite product was broken down to the natural grain size by crushing and attrition scrubbing as necessary. Particle size was then measured.

Magnetite was first produced with a maximum temperature in the reactor of approximately 750° C. Next, magnetite was produced with a maximum temperature in the reactor of approximately 1000° C. Table 1 shows a size analysis comparison of the two magnetite products. The magnetite produced at a temperature of approximately 750° C. is denoted M1 and magnetite produced at a temperature of approximately 1000° C. is denoted M2.

Surprisingly, M2 contains a much narrower distribution of particle sizes, with approximately 80 weight percent of magnetite particles from about 2 microns to about 10 microns in size. The M1 magnetite has a much wider particle size distribution and only approximately 50 percent of the magnetite particles are between 2 and 10 microns in size. Although the exact reason for this difference in size distribution is not fully understood, and while not wishing to be bound by any theory, it is felt that limited recrystallization of magnetite in the 1000° C. reaction was sufficient to narrow grain size distribution, but that recrystallization did not proceed to such an extent that excessive particle growth occurred.

Figure 6:
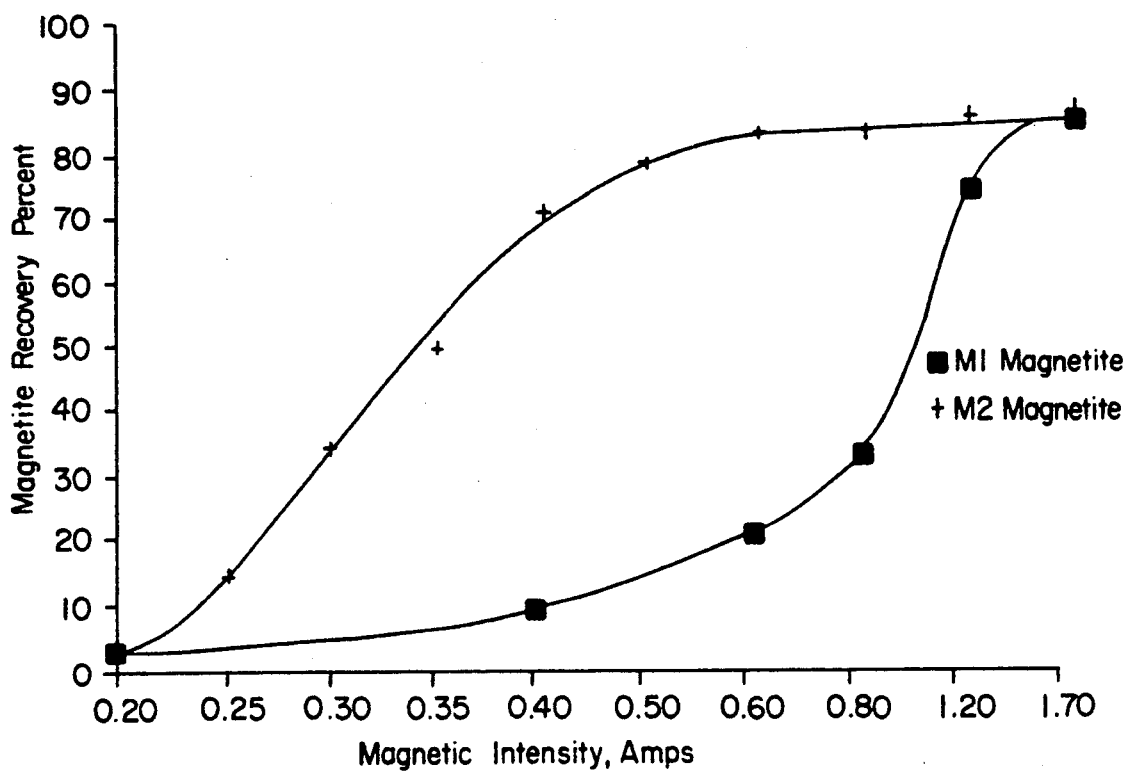
FIG. 6 is a graph showing the effect of magnetite type on magnetite recovery.

The relative absence of particles larger than 10 microns and particles smaller than 2 microns in M2 magnetite is advantageous for dense medium cyclone separation as shown in Example 4. The narrow size distribution of M2 magnetite is also advantageous for enhanced recovery of magnetite by magnetic separation following dense medium separation. FIG. 6 shows a graph of magnetite response to differing magnetic field strengths. The graph shows the amount of magnetite recovered in a Davis Tube separator as a function of magnetic intensity expressed as the current flowing through the coil of the electromagnet. M2 magnetite shows greater response to lower intensity magnetic fields and is therefor easier to recover in magnetic separators following dense medium separation.

TABLE 1

| | Magnetite Particle Size Distribution | |
|---|---|---|
| SIZE | WEIGHT PERCENT SMALLER THAN M1 | M2 |
| 44.0 microns | 99.9% | 98.0 |
| 31.1 | 98.9 | 97.2 |
| 22.0 | 93.7 | 95.2 |
| 15.6 | 86.2 | 92.1 |
| 11.0 | 75.4 | 91.4 |
| 7.78 | 67.5 | 85.9 |
| 5.50 | 59.8 | 70.0 |
| 3.89 | 51.6 | 41.1 |
| 2.75 | 38.2 | 19.8 |
| 1.94 | 21.8 | 8.2 |

TABLE 1-continued

| | Magnetite Particle Size Distribution | |
|---|---|---|
| SIZE | WEIGHT PERCENT SMALLER THAN M1 | M2 |
| 1.38 | 11.5 | 3.2 |
| 0.97 | 3.7 | 0.5 |

EXAMPLE 2

Classifying Cyclone Performance

Samples of minus 150 mesh (0.105 mm) Sewickley Seam coal were classified in a cyclone with varying inlet areas. The tests were in a 10" diameter cyclone. Inlet pressure was varied to maintain approximately equal feed rates for each test. Feed rates were within the normal range for industry design standards for the particular cyclone design. Thus the effect of increasing acceleration on particle separation could be evaluated as a function of velocity, without increasing volumetric flow rate beyond the industry design standards for the particular cyclone.

The inlet areas tested were 3.1 square inches, 0.96 square inches, and 0.48 square inches, with corresponding velocities of about 16 feet per second, 56 feet per second, and 104 feet per second, respectively. Table 2 shows the particle size at which 50 percent of the particles of that size report to overflow and 50 percent to underflow for each test. These test results show that classification occurs at a smaller size as inlet velocity is increased at a constant volumetric feed rate.

TABLE 2

| Classifying Cyclone Performance | | | |
|---|---|---|---|
| CYCLONE DIAMETER | INLET AREA | INLET VELOCITY | CLASSIFICATION SIZE (50% CUT POINT) |
| 10" | 3.10" | 16 ft/sec. | 31.8 microns |
| 10" | 0.96" | 56 ft/sec. | 11.3 microns |
| 10" | 0.48" | 104 ft/sec. | 5.5 microns |

EXAMPLE 3

Dense Media Cyclone Performance

Three tests were run to evaluate the effect of varying the inlet area, and consequently inlet velocity, on dense media cyclone separation at approximately constant volumetric flow rate. Sewickley Seam coal sized at 150 mesh (0.105 mm) by 15 microns (0.015 mm) was separated in 10" diameter cyclones. Inlet pressure was varied to maintain approximately equal inlet feed flow rates, within industry design standards for the particular cyclone, for all tests so that the effect of acceleration on separation could be evaluated as a function of inlet velocity. Inlet areas tested were 3.1 square inches, 0.96 square inches and 0.48 square inches, with corresponding velocities of 20.6 feet per second, 66.6 feet per second, and 133.2 feet per second, respectively. Dense media contained M2 magnetite, as shown in Table 1, for all tests.

Figure 7:
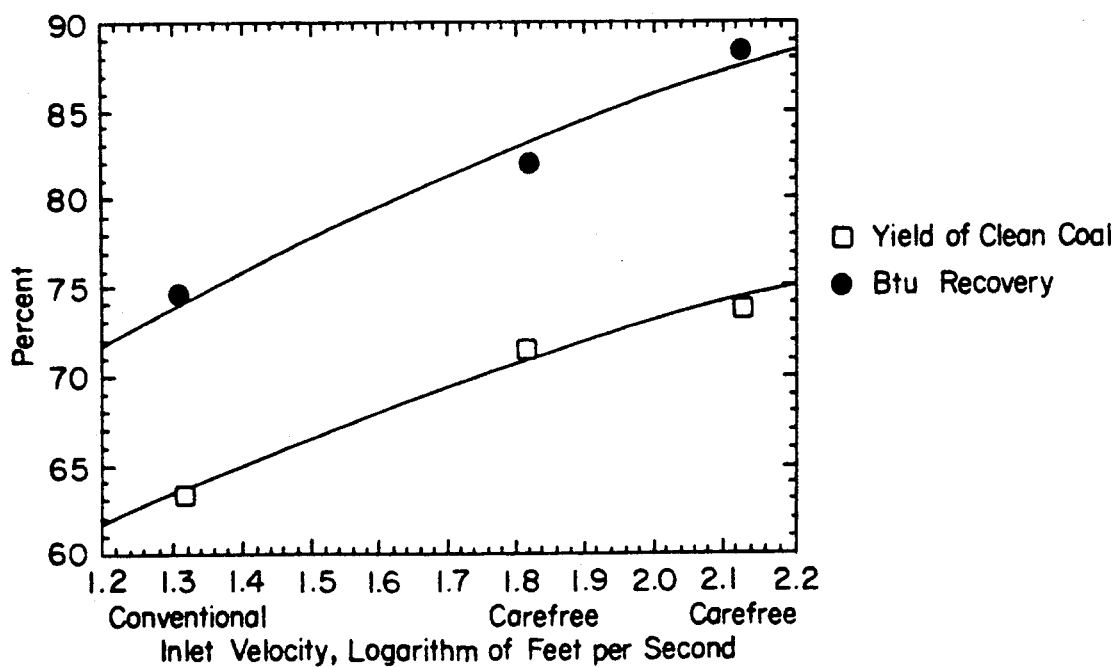
FIG. 7 is a graph illustrating the effect of velocity on separation of coal feed in dense medium cyclones.
Figure 8:
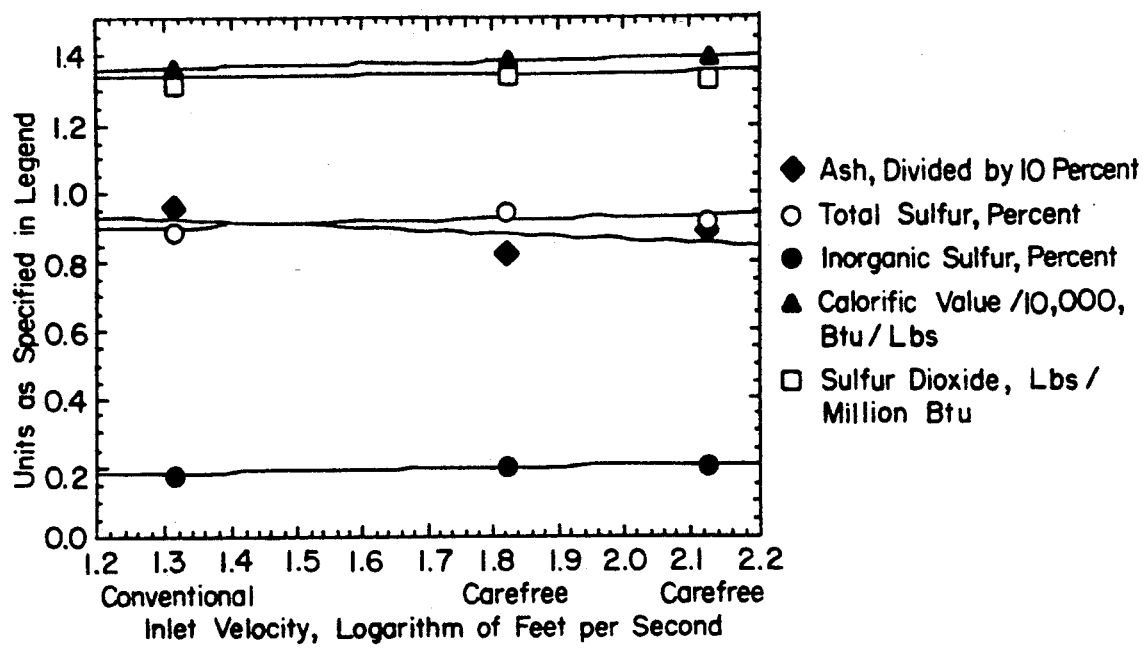
FIG. 8 is a graph illustrating the effect of velocity on the quality of the clean coal product from dense medium cycloning.

FIGS. 7 and 8 summarize results of the tests. FIG. 7 shows that the yield of clean coal product increases significantly with increasing inlet velocity into the cyclone. FIG. 7 also shows that a greater percentage of heating volume in the coal feed is recovered in the clean coal product at higher velocities. FIG. 8 shows that the clean coal product was of high quality in all tests. Thus, increasing the inlet velocity while holding the volumetric feed rate constant resulted in a substantial increase in the yield of clean coal without compromising the quality of the clean coal product.

Figure 9:
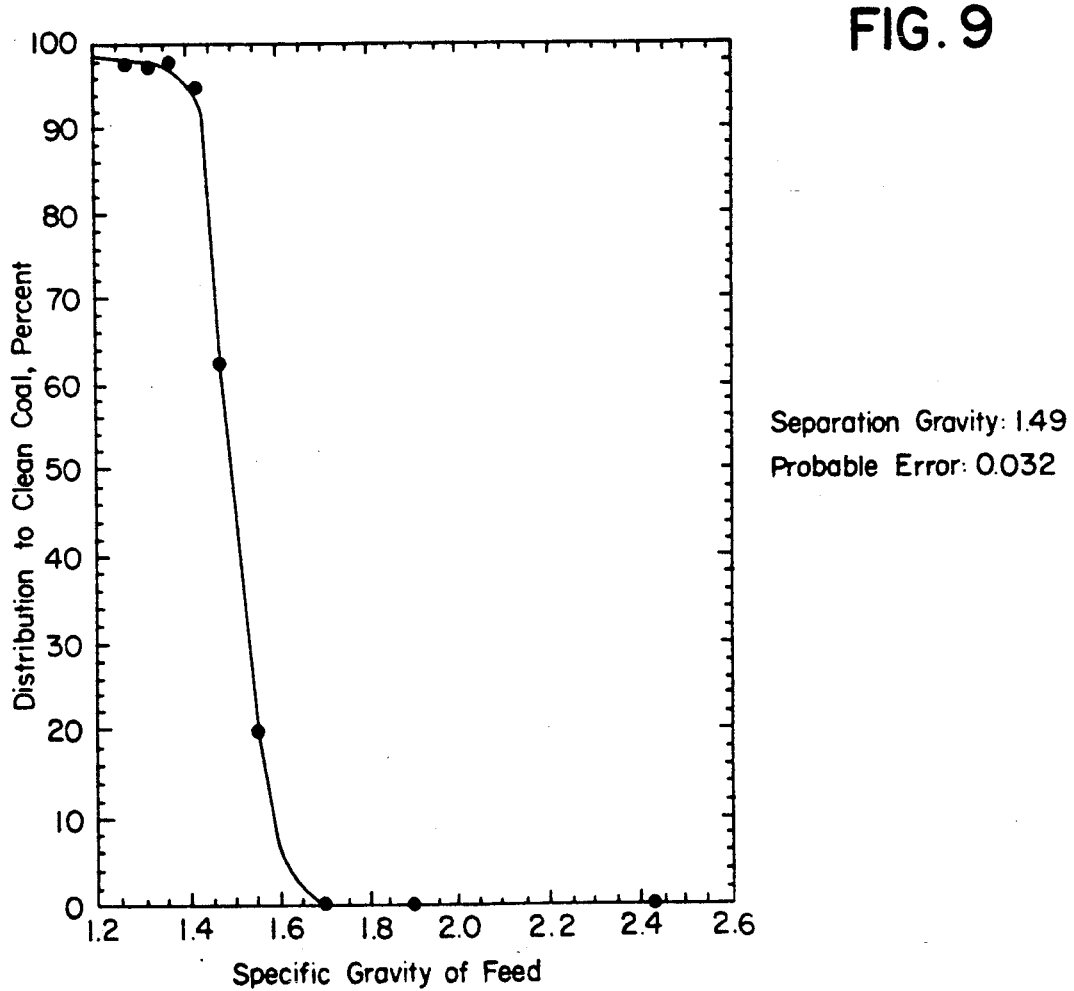
FIG. 9 is a graph showing a partition curve for classification of a 28 mesh by 150 mesh coal feed fraction.

Another test was run with an inlet area of 0.48 square inches and an inlet velocity of 133.2 feet per second on a 28 mesh (0.596 mm) by 150 mesh (0.105 mm) coal feed. FIG. 9 shows the partition curve for this test and a probable error of 0.032. High inlet velocities to cyclones at industry design standards for volumetric feed rates results in good separation of coal and non-coal material from fine coal feed.

EXAMPLE 4

Effect Of Magnetite Type on Dense Media Separation

Figure 10:
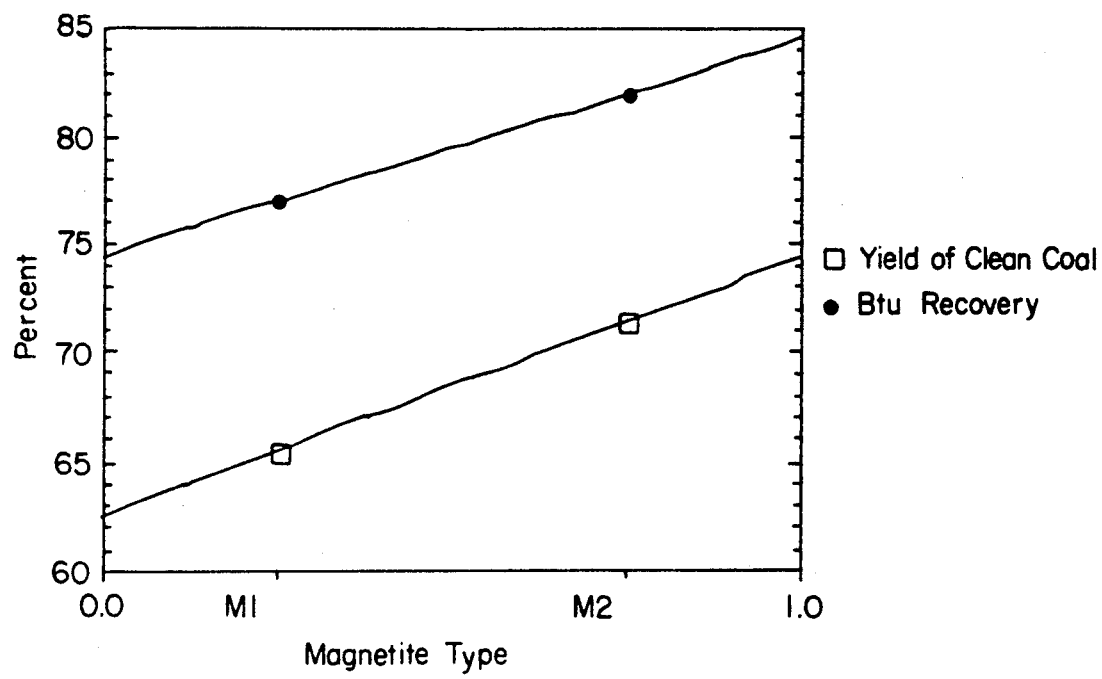
FIG. 10 is a graph showing the effect of magnetite particle size distribution on separation of coal feed in dense medium cyclones.
Figure 11:
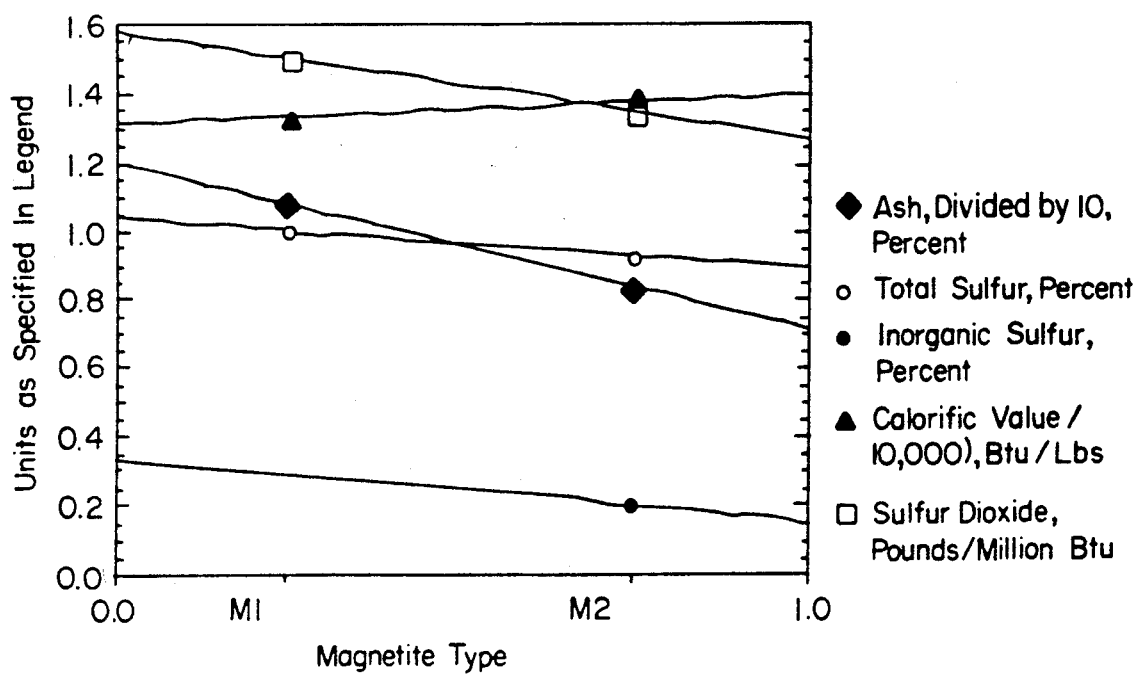
FIG. 11 is a graph showing the effect of magnetite particle size distribution on the quality of the clean coal product from dense medium cycloning.

Two tests were run to evaluate the separation performance using two different magnetite types, M1 and M2. Particle size distributions of M1 and M2 magnetites are shown in Table 1. Both tests were run using Sewickley Seam coal sized at 150 mesh (0.105 mm) by 15 microns (0.015 mm). Both tests were conducted in 10" cyclones with approximately equal feed rates. FIGS. 10 and summarize the results of the tests and demonstrate improved separation efficiency with the M2 magnetite. FIG. 10 shows the result that M2 magnetite improves the yield of clean coal product and the BTU recovery. FIG. 11 shows, surprisingly, that use of M2 magnetite also improved the quality of the clean coal product by reducing the ash and sulfur content and by increasing the BTU content of the clean coal product. M2 magnetite, even though having a larger average particle size than M1 showed improved separation efficiency. Thus, the size distribution of magnetite particles, and not just particle size, affects both coal separation efficiency and magnetite recovery efficiency.

Although the preferred embodiment has been described by way of illustration and example, as known to those skilled in the art, a number of variations and modifications of the invention can be practiced within the scope of the present invention as limited only by the appended claims.

What is claimed is:

1. A process for beneficiating coal comprising:
   (a) dividing a coal feed into two fractions, fraction 1 and fraction 2, based on particle size;
   (b) dividing said fraction 1 which contains larger-size particles than fraction 2, into three subfractions, subfraction 1A, subfraction 1B and subfraction 1C, based on density, said subfraction 1A being the least dense subfraction and containing predominantly coal, said subfraction 1C being the densest subfraction and containing predominantly non-coal material, and said subfraction 1B being the mid-density subfraction and containing a combination of coal and non-coal material;
   (c) further processing said subfraction 1B, said further processing comprising comminuting;
   (d) dividing fraction 2, which contains smaller-size particles than fraction 1, into at least three fractions, fraction 2A, fraction 2B and fraction 2C, based on particle size;
   (e) discarding as refuse said fraction 2A, which contains the smallest-size particles of any of fraction 2A, fraction 2B and fraction 2C;
   (f) separately processing fraction 2B and fraction 2C in dense medium separation units, with the dense medium comprising liquid and suspended magnetic particles, to separate each of fraction 2B and fraction 2C into a clean coal overflow and a refuse underflow;

(g) separately recovering magnetic particles from both overflow and underflow following dense medium separation of said fraction 2C, which contains larger-size particles than fraction 2B, by draining and then rinsing with water on a screen or sieve followed by removal of magnetic particles from the rinse water by magnetic separation; and (h) separately recovering magnetic particles from both overflow and underflow following dense medium separation of said fraction 2B, which contains smaller-size particles than fraction 2C, by magnetic separation.

2. The process of claim 1, wherein at least a portion of subfraction 1B following comminution in step (c) is added to the coal feed.

3. The process of claim 1, wherein subfraction 1A comprises at least about 85 weight percent coal.

4. The process of claim 1, wherein subfraction 1A comprises at least about 90 weight percent coal.

5. The process of claim 1, wherein subfraction 1A comprises at least about 95 weight percent coal.

6. The process of claim 1, wherein the amount of magnetic particles which is not recovered in step (g) is less than four pounds per ton of material subjected to magnetic particle recovery in step (g).

7. The process of claim 1, wherein the amount of magnetic particles which is not recovered in step (g) is less than ten pounds per ton of material subjected to magnetic particle recovery in step (g).

8. The process of claim 1, wherein the total amount of magnetic particles recovered in steps (g) and (h) is at least about 99 weight percent.

9. The process of claim 1, wherein at least about 75 weight percent of inorganic sulfur is separated from said coal feed.

10. The process of claim 1, wherein at least about 85 weight percent of inorganic sulfur is separated from said coal feed.

11. The process of claim wherein the resulting clean coal products contain at least about 65 percent of the total heating value of said coal feed.

12. The process of claim 1, wherein the resulting clean coal products contain at least about 80 percent of the total heating value of said coal feed.

13. The process of claim wherein magnetic separation in steps (g) and (h) consists essentially of separation in wet drum magnetic separators.

14. The process of claim 1, wherein said fraction 1 comprises particles, at least 90 percent of which are larger than about 0.5 mm in size, and wherein said fraction 2 comprises particles, at least 90 percent of which are smaller than about 0.5 mm in size.

15. The process of claim 1, wherein said fraction 1 contains particles larger than from about 0.25 mm to about 1 mm in size, and wherein said fraction 2 contains particles smaller than from about 0.25 mm to about 1 mm in size.

16. The process of claim 1, wherein said fraction 2 is divided into two fractions, based on particle size, fraction 3 being a first of said two fractions which contains larger-size particles than a second fraction, said second fraction being further divided into at least three fractions, fraction 2A, fraction 2B and fraction 2C, said fraction 3 being further divided into three subfractions based on density, subfraction 3A, subfraction 3B and subfraction 3C, said subfraction 3A being the least dense subfraction and containing predominantly clean coal, said subfraction 3C being the densest subfraction and containing predominantly non-coal material, and said subfraction 3B being the mid-density subfraction and containing a combination of coal and non-coal material.

17. A process of claim 1, wherein said fraction 1 contains particles larger than about 0.4 mm to 0.6 mm, and wherein said fraction 2 contains particles smaller than about 0.4 mm to 0.6 mm.

18. The process of claim 1, wherein dense medium separation of said fraction 2C in step (f) is the same as processing of said fraction 1 in step (b).

19. The process of claim 1, wherein said subfraction 1A comprises overflow from density separation wherein the density of separation occurs at a specific gravity within about 0.1 specific gravity units of the specific gravity of the coal being processed.

20. The process of claim 1, wherein said fraction 1A comprises overflow from a density separation wherein the density of separation occurs at a specific gravity from about 1.2 to about 1.4.

21. The process of claim 1, wherein said subfraction 1C comprises underflow from a density separation wherein the density of separation occurs at a specific gravity of at least 0.5 specific gravity units in excess of the specific gravity of the coal being processed.

22. The process of claim 1, wherein said subfraction 1C comprises underflow from a density separation wherein the density of separation occurs at a specific gravity from about 1.8 to about 2.1.

23. The process of claim 1, wherein said subfraction 1C comprises underflow from a density separation wherein the density of separation occurs at a specific gravity of at least 0.35 specific gravity units in excess of the specific gravity of the coal being processed.

24. The process of claim 1, wherein the coal feed comprises anthracite coal, and wherein said subfraction 1C comprises underflow from a density separation wherein the density of separation occurs at a specific gravity of at least 0.3 in excess of the specific gravity of said anthracite coal.

25. The process of claim 1, wherein said fraction 2 is divided into exactly three fractions based on particle size in step (d).

26. The process of claim 1, wherein said fraction 2A comprises the overflow from a classifying cyclone.

27. The process of claim 1, wherein said fraction 2A comprises the overflow from a classifying cyclone comprising an inlet orifice and a cyclone feed chamber, and wherein the average velocity of the feed of said first fraction through the inlet orifice by which the particles enter the cyclone feed chamber is at least 60 feet per second.

28. The process of claim 1, wherein said fraction 2A, comprises the overflow from a classifying cyclone comprising an inlet orifice and a cyclone feed chamber, and wherein the average velocity of the feed of said first fraction through the inlet orifice by which the particles enter the cyclone feed chamber is at least 90 feet per second.

29. The process of claim 1, wherein said magnetic separation in step (g) is in one or more wet drum magnetic separators.

30. The process of claim 1, wherein the dense medium separation units in step (f) are dense medium cyclones, and wherein said dense medium cyclones are capable of separating a fraction of coal feed comprising particles smaller than from about 0.4 m to about 0.6 mm in size and larger than from about 0.085 mm to about 0.125 mm in size with a probable error of less than 0.05.

31. The process of claim 1, wherein the dense medium separation units in step (f) are dense medium cyclones, and wherein said dense medium cyclones are capable of separating a fraction of coal feed comprising particles smaller than from about 0.4 mm to about 0.6 mm in size and larger than from about 0.085 mm to about 0.125 mm in size with a probable error of less than 0.035.

32. The process of claim 1, wherein said fraction 2A predominantly comprises particles smaller than from about 0.01 mm to about 0.025 mm in size.

33. The process of claim 1, wherein said fraction 2C has a maximum particle size of from about 0.4 mm to about 0.6 mm and a minimum particle size of from about 0.085 mm to about 0.125 mm, said fraction 2B has a maximum particle size of from about 0.085 mm to about 0.125 mm and a minimum particle size of from about 0.01 mm to about 0.025 mm, and said fraction 2A has a maximum particle size of from about 0.01 mm to about 0.025 mm.

34. The process of claim 1, wherein the dense medium separation units in step (f) comprise dense medium cyclones, each having an inlet orifice and a cyclone feed chamber, and wherein the average velocity of the feed through the inlet orifice by which the particles enter a cyclone feed chamber is at least 30 feet per second.

35. The process of claim 1, wherein the dense medium separation units in step (f) comprise dense medium cyclones, each having an inlet orifice and a cyclone feed chamber, and wherein the average velocity of the feed through the inlet orifice by which the particles enter a cyclone feed chamber is at least 60 feed per second.

36. The process of claim 1, wherein the dense medium separation units in step (f) comprise dense medium cyclones, each having an inlet orifice and a cyclone feed chamber, and wherein the average velocity of the feed through the inlet orifice by which the particles enter a cyclone feed chamber is at least 90 feed per second.

37. The process of claim 1, wherein the dense medium separation units in step (f) are dense medium cyclones, and wherein said dense medium cyclones are capable of separating a fraction of coal feed comprising particles smaller than from about 0.085 mm to about 0.125 mm in size and larger than from about 0.010 to about 0.025 mm in size with a probable error of less than 0.08.

38. The process of claim 1, wherein the dense medium separation units in step (f) are dense medium cyclones, and wherein said dense medium cyclones are capable of separating a fraction of coal feed comprising particles smaller from about 0.085 mm to about 0.125 mm in size and larger than from about 0.010 to about 0.025 mm in size with a probable error of less than 0.12.

39. The process of claim 1, wherein the dense medium in step (f) comprises water and magnetite particles.

40. The process of claim 1, wherein the dense medium in step (f) comprises water and magnetite particles and at least about 60 weight percent of the magnetite particles are from about 2 microns to about 10 microns in size.

41. The process of claim 1, wherein the dense medium in step (f) comprises water and magnetite particles and at least about 75 weight percent of the magnetite particles are from about 2 microns to about 10 microns in size.

42. The process of claim 1, wherein the dense medium in step (f) comprises water and magnetite particles and no more than about 10 weight percent of the magnetite particles are less than about 2 microns in size.

43. The process of claim 1, wherein the dense medium in step (f) comprises water and magnetite particles and no more than about 25 weight percent of the magnetite particles are smaller than about 3 microns in size.

44. The process of claim 1, wherein the dense medium in step (f) comprises water and magnetite particles and at least about 10 weight percent of the particles are greater than about 7 microns in size.

45. The process of claim 1, wherein the dense medium in step (f) comprises water and magnetite particles and wherein said magnetite particles are produced from reduction of hematite wherein during said reduction, the hematite is subjected to a maximum temperature of from about 900° C. to about 1000° C.

46. The process of claim 1, wherein the dense medium in step (f) comprises water and magnetite particles and wherein said magnetite particles are produced from reduction of hematite, wherein said reduction takes place under such conditions of residence time and temperature that crystal growth of magnetite produced is limited such that magnetite particles produced are of a size such that at least about 60 weight percent of such magnetite particles are from about 2 microns to about 10 microns in size.

47. The process of claim 1, wherein the dense medium in step (f) comprises water and magnetite particles and wherein said magnetite particles are produced from reduction of hematite, wherein said reduction takes place under such conditions of residence time and temperature that crystal growth of magnetite produced is limited such that magnetite particles produced are of a size such that at least about 75 weight percent of such magnetite particles are from about 2 microns to about 10 microns in size.

48. The process of claim 1, wherein the dense medium in step (f) comprises water and magnetite particles, and wherein said magnetite particles are produced by spray roasting an aqueous solution of iron chloride at a maximum temperature in the reactor of from about 900° C. to about 1000° C.

49. The process of claim 1, wherein the dense medium in step (f) comprises water and magnetite particles and wherein said magnetite particles are produced by spray roasting an aqueous solution of iron chloride under such conditions of residence time and temperature that crystal growth of magnetite produced is limited such that magnetite particles produced are of a size such that at least about 60 weight percent of such magnetite particles are from about 2 microns to about 10 microns in size.

50. The process of claim 1, wherein the dense medium in step (f) comprises water and magnetite particles and wherein said magnetite particles are produced by spray roasting an aqueous solution of iron chloride under such conditions of residence time and temperature that crystal growth of magnetite produced is limited such that magnetite particles produced are of a size such that at least about 75 percent of such magnetite particles are from about 2 microns to about 10 microns in size.

51. The process of claim 1, wherein recovery of dense medium particles in step (h) is by magnetic separation in wet drum magnetic separators arranged in a rougher-cleaner-scavenger circuit with the scavenger unit containing a rare earth magnet.

52. The process of claim 1, wherein effluent liquid following removal of magnetic particles by magnetic separation in step (h) is used to dilute feed to said magnetic separation unit in step (h).

53. The process of claim 1, wherein effluent liquid following removal of magnetic particles in step (g) is added to said fraction 2B prior to processing of said fraction 2B in step (f).

* * * * *